May 20, 1941.    M. EWALD ET AL    2,242,242
FRUIT TREATING APPARATUS
Original Filed Feb. 18, 1936    9 Sheets-Sheet 1

INVENTORS
Mark Ewald
Henry Skog
BY Cox & Moore
ATTORNEYS

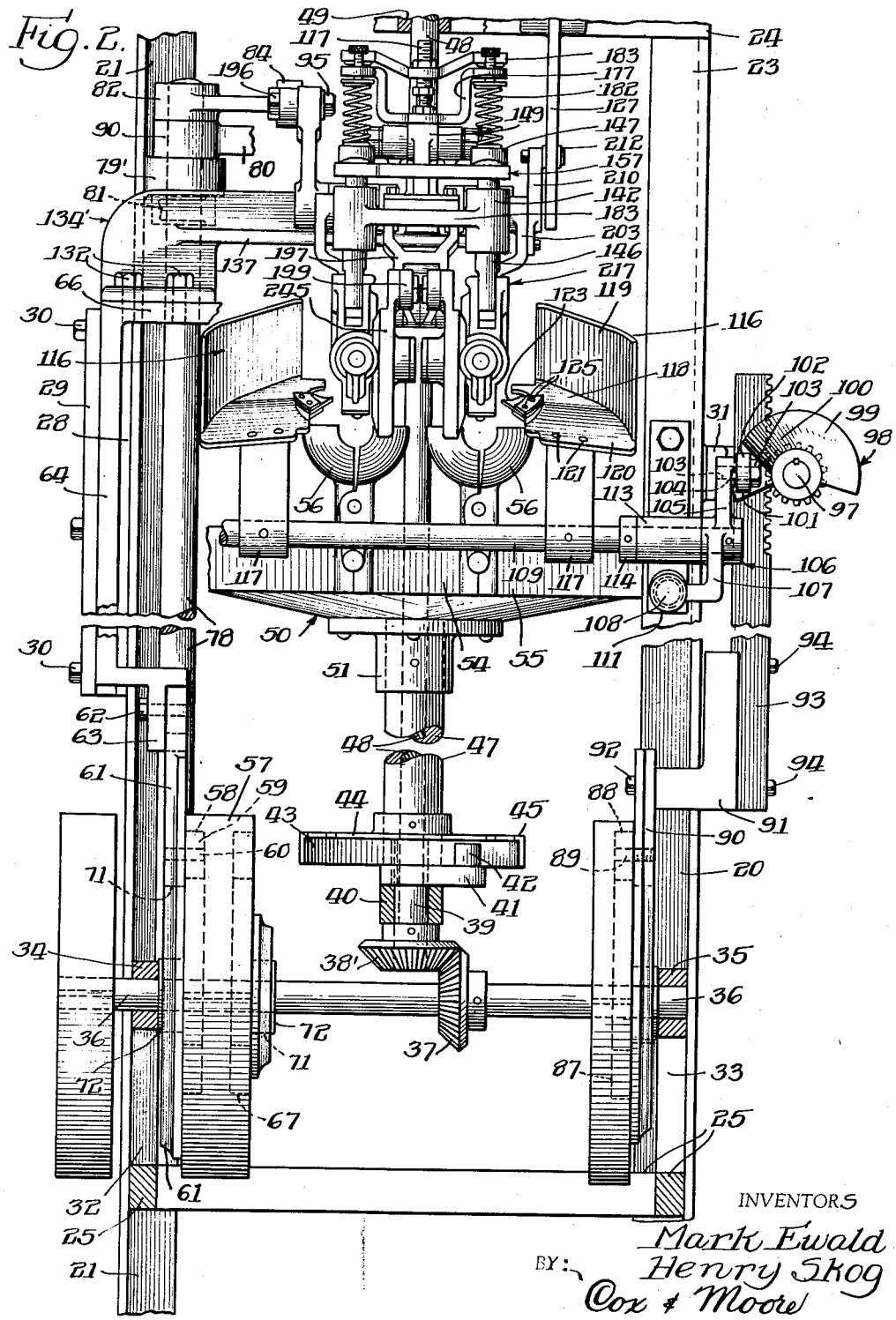

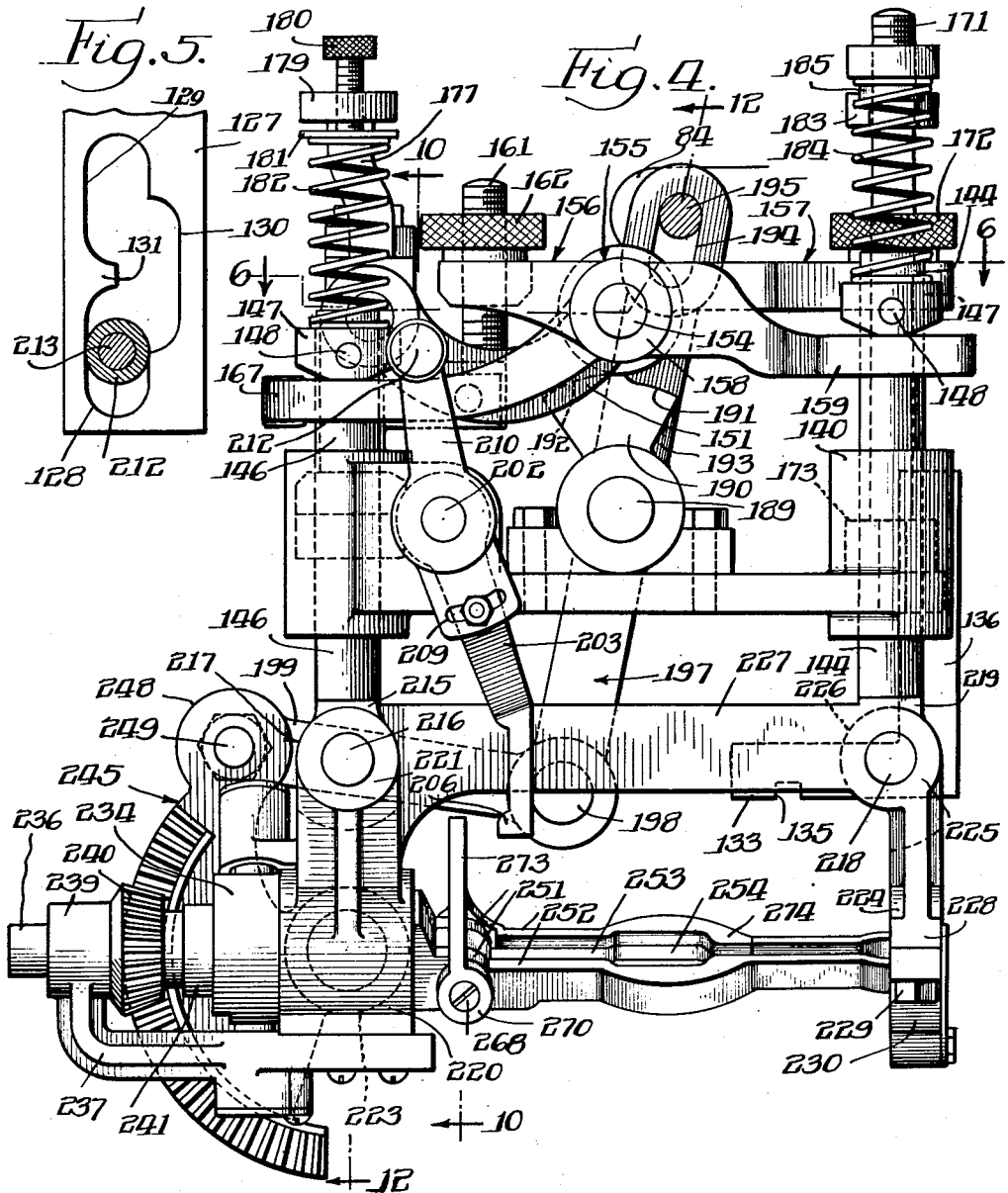

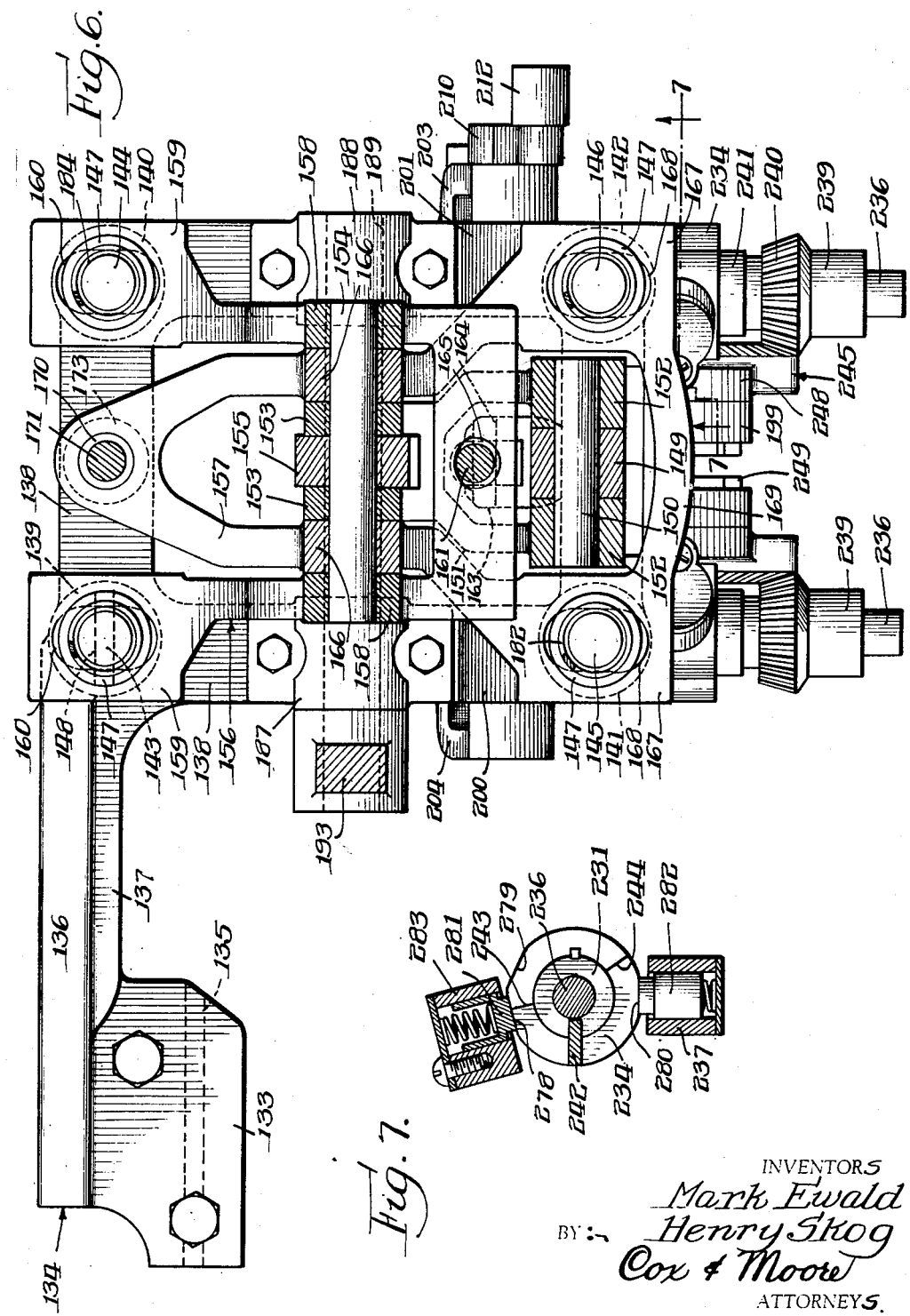

May 20, 1941.　　　M. EWALD ET AL　　　2,242,242
FRUIT TREATING APPARATUS
Original Filed Feb. 18, 1936　　9 Sheets-Sheet 5
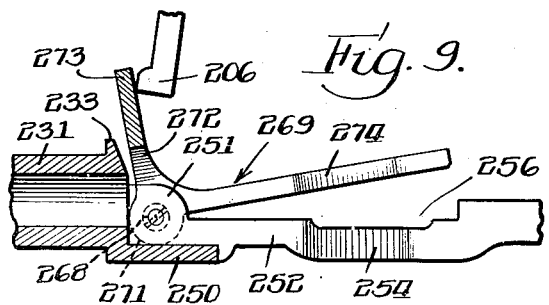
INVENTORS
Mark Ewald
Henry Skog
BY: Cox & Moore
ATTORNEYS.

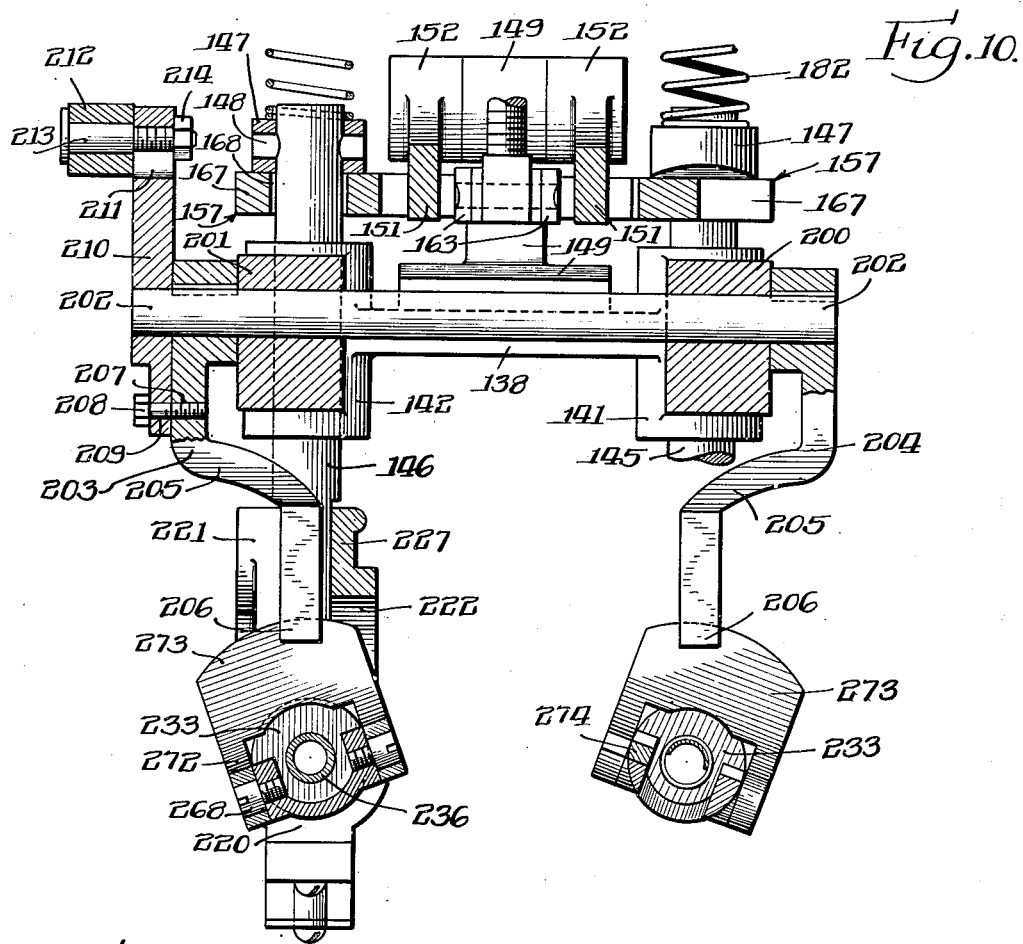

May 20, 1941.  M. EWALD ET AL  2,242,242
FRUIT TREATING APPARATUS
Original Filed Feb. 18, 1936  9 Sheets-Sheet 7

INVENTORS
Mark Ewald
Henry Skog
BY Cox & Moore
ATTORNEYS.

INVENTORS
Mark Ewald
Henry Skog
BY Cox & Moore
ATTORNEYS.

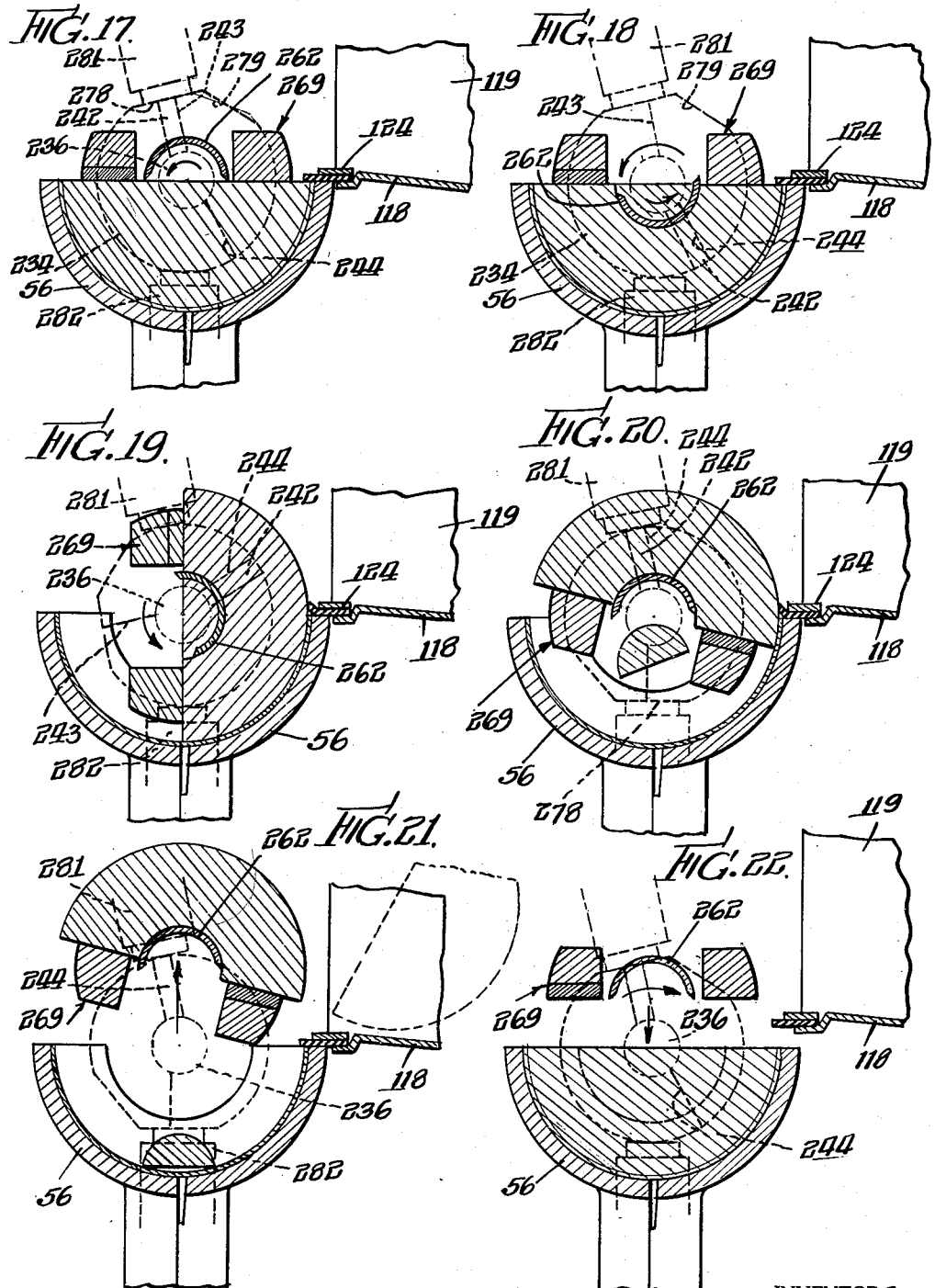

Patented May 20, 1941

2,242,242

UNITED STATES PATENT OFFICE 2,242,242

FRUIT TREATING APPARATUS

Mark Ewald and Henry Skog, Olympia, Wash., assignors to Special Equipment Company, Portland, Oreg., a corporation of Oregon Application February 18, 1936, Serial No. 64,526
Renewed November 22, 1939

56 Claims. (Cl. 146—39)

This invention relates to a machine and process for treating fruit.

Among the objects of the present invention are to provide a process and apparatus for coring or pitting a half section of fruit and ejecting the body of the fruit from the receptacle while depositing the peel and core or pit therein; to provide an improved process and apparatus for preventing the bruising or fracturing of the fruit during the ejection of the fruit from the fruit treating machine; to provide an improved mechanism for a fruit coring or pitting means and associated means to eject such core or pit and peeled fruit into a chute; to provide an improved fruit coring and pitting and ejecting means and a combined peel retaining and discharging chute, both of such means moving in timed relation with a series of intermittently moving receptacles and coming into effective position during the period of rest between peeling such fruit; to provide a new and improved coring or pitting and fruit ejector which is positive in operation, which is not affected in its operation and efficiency by the presence of sugary fruit juices, and which has a uniform action upon the fruit sections; to provide a combined coring and fruit ejector wherein the fruit ejector is contacted with the fruit at the correct tension in order to resist upward reactive movement of the ejector due to the core cutting mechanism; to provide a pitting or coring means which cooperates with the fruit ejector and assists in holding the fruit in inverted position upon the ejector until the fruit is forcibly and positively ejected from the ejector; to provide an improved coring or pitting mechanism for coring or pitting half fruit or fruit sections wherein the coring or pitting mechanism approaches the fruit at generally right angles at the fruit surface to be contacted; to provide such a pitting or coring mechanism wherein the mechanism yieldingly approaches the fruit; to provide a coring or pitting mechanism wherein the approach to the fruit is yielding at both the ends of the fruit; to provide a coring or pitting mechanism which approaches the cut face of the fruit with sufficient pressure at the blossom end of the fruit to counteract the reaction of the pitting or coring cutter and which yieldingly approaches the fruit at the neck end to take up variations in thickness of the fruit; to provide a coring mechanism for fruit such as half pears, wherein the pressure of contact of the coring mechanism on the cut face of the fruit is adjustably and predeterminately applied to both the neck end and blossom end of the fruit, for the purpose of counteracting the reaction of the coring spoon and to adjustably compensate for variations in thickness of the fruit at the neck; to provide a coring mechanism wherein means is provided to give a uniform downward pressure on the face of the fruit while coring or pitting; to provide a coring or pitting mechanism for a fruit treating machine which includes a cross head for carrying fruit face contacting members or paddles and a coring or pitting means or spoon which is timed to raise and lower in synchronism with the movement of the turrets and the fruit holding members carried thereby; to provide a fruit coring machine wherein the coring mechanism is given a substantially right-angled approach and at a uniform pressure throughout the surfaces of the fruit to be cored, whereby an improved pitting or coring operation including a complete and clean cut uniformly of the fruit, and particularly at the ends of the fruit, is obtained; to provide an improved coring mechanism for coring half pears wherein a complete and uniform coring of the pear, particularly at the stem end of the pear and also at the blossom end of the pear, is secured; to provide an improved means for discharging half fruits from their holders upon the completion of the coring or pitting operation whereby the fruits are ejected without bruising them; to provide an improved coring means for fruit which includes a mechanism for slightly raising the coring mechanism from the face of the fruit at the completion of the coring and particularly whereby portions of the coring mechanism are raised higher at the neck end of the half fruit than at the butt or blossom end in order to accommodate various sizes and variations of the fruit, particularly of pears wherein the variations of the neck are greater than the variations of the butt; to provide improved means for affording a lift to the fruit contacting or paddle mechanism for the purpose of relieving the contacting means or paddle of all downward pressure on the face of the fruit during the inverting operation of the fruit preliminary to its discharge from the fruit holder and whereby to prevent bruising of the fruit; to provide an improved mounting whereby the paddle and coring or pitting cross head are mounted or bolted directly on the peeling cross head slide for vertical reciprocation thereabove for the purpose of providing a more compact, economical, and more efficiently operative construction; to provide for a gentle ejection of the fruit from the machine and particularly to provide for the ejection of the fruit from the machine by diagonally inverting the fruit and ejecting the same sidewise into a contiguous or adjacent hopper; to provide a diagonal inversion of the discharging fruit whereby the same will be ejected laterally into a hopper overlying the open edge of the fruit holder; to provide a discharge hopper to receive the peeled and pitted or cored fruit which is positioned so close to the fruit holder during the discharging mechanism that the hopper must be raised to move the fruit holder to the rest station; to provide a fruit receiving hopper forming a moving portion of the fruit holding means; to provide means for turning the fruit in its holder to a diagonal position for lateral ejection therefrom and to provide a coring or pitting construction adapted to retain the fruit on the diagonally disposed inverting means prior to the forcible ejection of the fruit from said means; to provide a movable hopper for receiving the discharged fruit from the ejecting mechanism which shifts forwardly to eject the fruit outwardly of the machine; to provide a hopper for receiving the discharged fruit which shifts to clear the cups to permit their movement and which shifts to clear the peeling retaining flaps from the fruit holders; to provide driving mechanism for rotating the coring or pitting knife and fruit inverting mechanism comprising linkage actuated from the same shaft that positions the peeling and coring or pitting mechanism; to provide an improved ejecting mechanism which imparts a substantial rolling action to the half fruit as it is ejected into the hopper whereby insuring the lateral, gentle ejection of the fruit without bruising; to provide an improved construction of coring paddle or fruit ejecting device which prevents the gathering of stems between the paddle and the ejector mechanism; to provide an improved framework construction including vertical sills for the raising and lowering of the reciprocating cross head; to provide such a construction wherein the cross head is provided with four post bearings and four posts, two for each paddle mechanism, and wherein the cross head carries a transmission shaft and an upper shifting fulcrum mechanism operable by a cam on the transmission shaft for operating the fulcrum levers for giving the paddle at the neck end a greater raising movement than at the blossom end; to provide a shifting fulcrum construction for providing a differential lift to the opposite ends of the fruit contacting means; to provide these and other objects of the invention as will be apparent from a perusal of the following specification when taken in connection with the accompanying drawings, wherein:

Fig. 2 is a front view of the machine shown in Fig. 1;

Fig. 4 is a detail right side view of the pitting or coring and ejecting mechanism;

Fig. 5 is a detail side view of the cam for tripping the ejecting mechanism;

Fig. 6 is a plan section taken on line 6—6 of Fig. 4;

Fig. 7 is a detail section taken on line 7—7 of Fig. 6;

Fig. 8 is a central vertical section taken on line 8—8 of Fig. 1;

Fig. 9 is a detail section of the ejecting finger;

Fig. 10 is a transverse section taken on line 10—10 of Fig. 4;

Fig. 11 is a plan view of the coring or pitting and ejecting device;

Fig. 12 is a transverse section taken on line 12—12 of Fig. 4;

Fig. 13 is a detail side view of an ejecting chute and a fruit receptacle during the period of operation;

Figure 17 is a sectional diagrammatic view showing the fruit turning mechanism and the seed section severing means in position overlying and contacting the cut face of a half fruit;

Figure 18 is a similar view showing the seed severing means having revolved 180 degrees to sever the seed section;

Figure 19 is a similar view showing the auxiliary fruit holding mechanism turning in a counterclockwise direction in a start to discharge the half fruit from the fruit holder and for the purpose of discharging the severed seed section into the bottom of the fruit holding cup on top of the peeling;

Figure 20 is a similar view showing the seed section being discharged and the fruit section almost in inverted position, the rubber diaphragm serving to hold the peeling in the cup during this operation;

Figure 21 shows the auxiliary fruit holding mechanism raising from the cup while in slightly inclined position to discharge the half fruit laterally; and Figure 22 is a view showing the seed severing means and auxiliary fruit holding means poised in position over a successive half fruit at the start of the sequence of operation.

In all of these views the mechanism as shown in Figure 7 of the drawings is indicated in dotted lines.

The invention of the present application is capable of adaptation to many types of fruit treating machines for carrying out the objects and results thereof. We have preferably shown the invention as applied to a machine of the turret type and particularly and preferably to a machine of the general type set forth in prior patents issued to Mark Ewald, No. 2,015,666 and No. 2,161,807. In some instances certain aspects of the invention are peculiarly adapted for improving certain aspects of the before mentioned Ewald inventions. However, it is to be understood that despite such particular adaptations the generic features of the invention are adaptable to any type of mechanism.

It is also to be understood that the aspects of the invention from a generic standpoint are adaptable to the pitting and/or coring of any type of fruit and for which the invention may be appropriable. In certain aspects the invention has particular reference to mechanisms for coring half pears.

For the purpose of facility in exemplification we shall describe the invention as applied to a fruit treating machine of the type illustrated in the accompanying drawings, wherein the machine comprises four stations situated preferably ninety degrees apart about a central vertical shaft. These stations are stations A, B, C, and D. The instant invention is adaptable at station C when the invention is applied to a completely automatic machine. At station A whole fruit is fed to the machine, preferably by a feeding turret, where it is introduced to a bobbing and splitting mechanism where the stem end of the fruit is removed and the remaining body of the fruit is split lengthwise of the core into equal halves. The halves are spread into paired receptacles with their severed faces exposed upwardly in a substantially horizontal plane. At station B the peels of the halved fruit in the paired receptacles are severed from the body of the fruit. At station C the core is severed from the body of the fruit, the body being ejected from the machine while depositing the peels and cores in the receptacles. At station D the peels and cores that were deposited in the receptacles at station C are scavenged from such receptacles.

It must be obvious that the invention is likewise adaptable irrespective of whether the halved fruits are prepared at other stations on the same machine or irrespective of other operations performed upon the fruit, unless such other operations specifically enter into combination with certain of the aspects of the invention.

Figure 1:
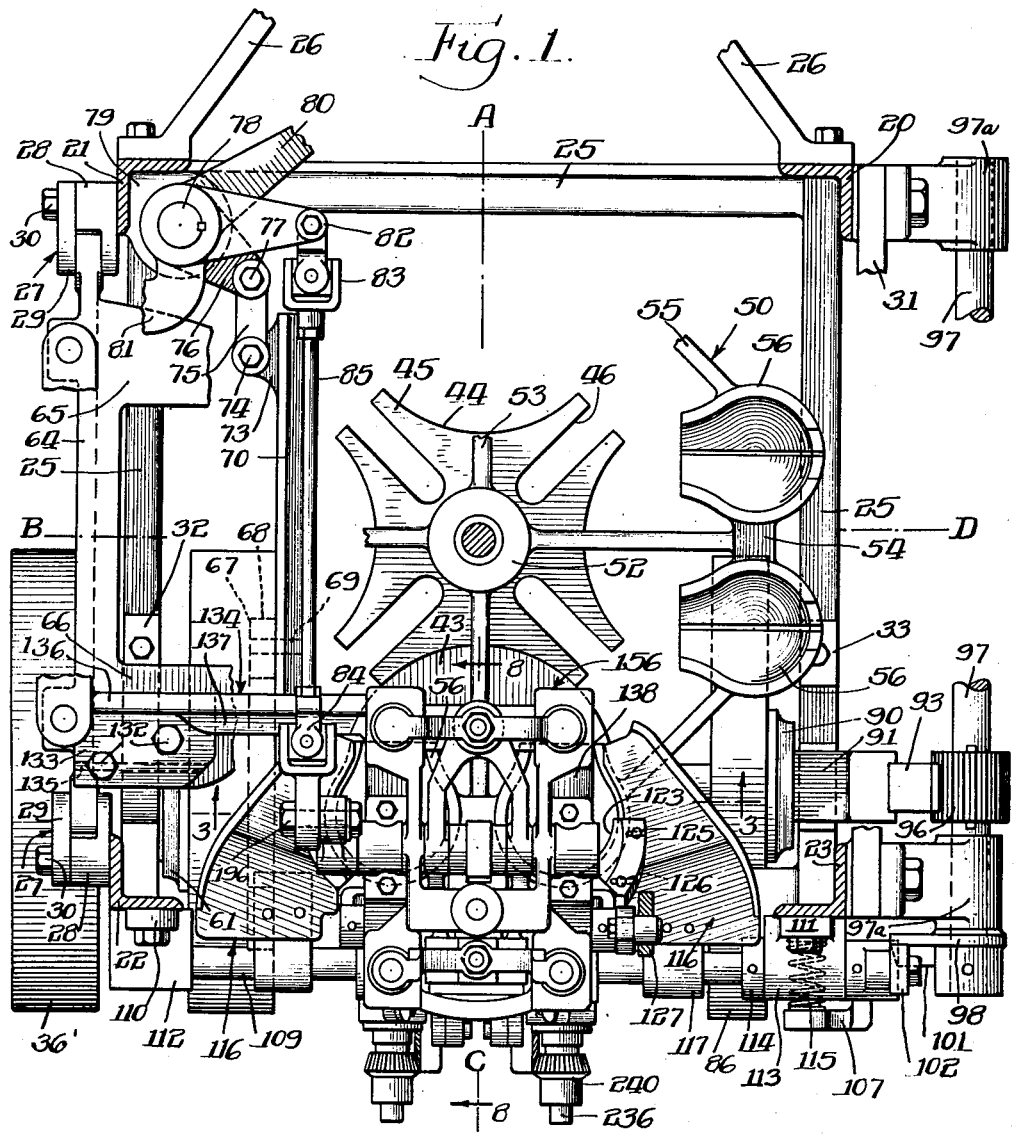
Fig. 1 is a plan view of a fruit treating machine showing one adaptation of the coring or pitting and ejecting mechanism to such a machine.

Reverting now to a description of the illustrated machine, it comprises a rigid framework including four upright posts 20, 21, 22 and 23, as shown in Figures 1 and 2, spaced apart and supported by an upper rectangular horizontal frame member 24 and a lower rectangular horizontal frame member 25. A horizontal frame member 26 bolted to uprights 20 and 21 extending outwardly therefrom supports the splitting and bobbing mechanism, the latter forming no part of this invention. A pair of vertical guides 27 have guide blocks 28 and cover plates 29 which are secured together and to the uprights 21 and 22 by bolts 30. A transverse frame member 31 extends between and is secured to the uprights 20 and 23. Two standards 32 and 33 are bolted upon the lower frame member 25 and are provided with bearings 34 and 35.

Power from a central source, through a series of cams, links, levers, and arms, drives the various mechanisms of the entire machine in a timed and synchronous manner from a main transverse cam shaft 36. The shaft 36 is journalled in the bearings 34 and 35 of standards 32 and 33.

A pulley 36' is keyed on the cam shaft 36 and is driven by any suitable means. A bevel gear 37 keyed on the central portion of cam shaft 36 meshes with a bevel pinion 38 keyed on the lower end of a stud shaft 39. The stud shaft 39 is supported by a bearing block 40. Bearing block 40 is positioned by a vertical arm (not shown) extending upwardly from the lower frame member 25. A driving arm 41 of a Geneva stop having a roller 42 is keyed to the upper end of stud shaft 39. A circular portion 43 of the Geneva stop disk is integral with the arm 41 and meshes with hollow portions 44 in a Geneva gear 45. The Geneva gear 45 has radial slots 46 to register with the roller 42, Fig. 2, on arm 41. The Geneva gear 45 is keyed or secured in any suitable manner to a sleeve 47 surrounding a central vertical shaft 48. A bearing 49 in the upper frame member 24 and bearing block 40 provide a support for shaft 48.

A main turret 50, as shown in Figures 1 and 2, is supported by and is secured on a socket 51. The socket 51 is secured on the sleeve 47. The turret 50 consists of a hub 52 having four radially extending spokes 53 spaced 90 degrees apart about the center of said hub. Integral with the outer ends of spokes 53 are transverse webs 54 re-enforced by interconnecting webs 55. The transverse webs 54 support paired receptacles 56.

A double faced cam 57, as shown at the bottom of Figure 2, keyed on shaft 36 has a cam groove 58 in which a cam roller 59 rides. The cam roller 59 is rotatably mounted upon a stud pin 60 from a cam follower plate 61. A bolt 62 clamps an arm 63 of a yoke 64 to cam follower plate 61. The yoke 64 reciprocates vertically within the guides 27. Two arms 65 and 66 extend inwardly of the machine from the upper end of yoke 64 to support the peeling mechanism.

A cam groove 67, as shown at the bottom of Figure 2, complemental to cam groove 58, in the opposing face of cam 57, co-acts with a cam roller 68. Cam roller 68 is rotatably mounted upon a pin 69, see Fig. 1, from a cam follower plate 70. The cam follower plates 61 and 70 are guided at one end by longitudinal slots 71 riding on hubs 72 of the cam 57.

An ear 73 integral with the extended end of follower plate 70 is apertured to receive a bolt or pin 74 (see upper left-hand portion of Figure 1). One end of a link 75 is pivotally mounted on the bolt 74, the other end of the link 75 being pivotally secured to an arm 76 by a pin or bolt 77. The arm 76 is firmly keyed to a rocker shaft 78. The shaft 78 is journaled in bearings 79 secured to the upright 21. A lever 80 keyed to the upper end of rocker shaft 78 just above bearing 79 actuates the bobbing and splitting mechanism. Another lever 81 keyed to shaft 78, just below the bearing 79, actuates the peeling mechanism. A third lever 82 keyed to the rocker shaft 78, just above the lever 80 actuates the coring mechanism and is connected thereto by a universal joint 83 on lever 82 joined to a second universal joint 84 by a connecting rod 85. The universal joint 84 is bolted to an operating lever of the coring device.

A second face cam 86 keyed on cam shaft 36 has a cam groove 87 (see bottom right-hand portion of Figure 2). A cam roller 88, rotatably mounted on a pin 89 rides in the cam groove 87. The end of pin 89 is threaded into a tapped hole in a cam follower plate 90. A bracket 91 is secured to the upper end of follower plate 90 by bolts 92. A rack bar 93 is rigidly secured to the bracket 91 by bolts 94. Rack teeth on the upper end of rack bar 93 mesh with a pinion 96 keyed on a transverse shaft 97. Shaft 97 is supported by bearing 97A bolted to transverse frame member 31. The shaft 97 supports and operates the scavenging mechanism.

A cam plate 98 (see right-hand portion of Figure 2) keyed to the forward end of shaft 97 has a low camming surface 99, a rising camming surface 100, and a high camming surface 101. Cam plate 98 acts upon a cam roller 102 pivotally mounted on a bolt 103. Bolt 103 is threaded into a tapped hole 104 in an arm 105 of a lever 106. A leg 107, depending from the hub of lever 106, is bent inwardly and has a tension adjustment 108 for keeping roller 102 against cam 99. The hub of lever 106 is keyed on one end of a transverse shaft 109 extending across the front of the machine. Brackets 110 and 111 having bearings 112 and 113 bolted to uprights 22 and 23 rotatably support shaft 109. A collar 114 pinned to shaft 109 to one side of bearing 113 and the hub of lever 106 pinned or keyed to shaft 109 on the other side of bearing 113 prevents axial movement of the shaft 109. A coil spring 115 is positioned between the adjustment 108 of lever 106 and bracket 111.

Two discharging chutes 116 (see Figures 1 and 2) are positioned on shaft 109 to each side of the paired receptacles 56. The chutes 116 are identical in shape, construction, and function except in a reverse manner; only the one to the right in Figures 1 and 2 will be described with the understanding that the description and reference numerals used will apply equally well to both right and left hand assemblies.

Figure 3:
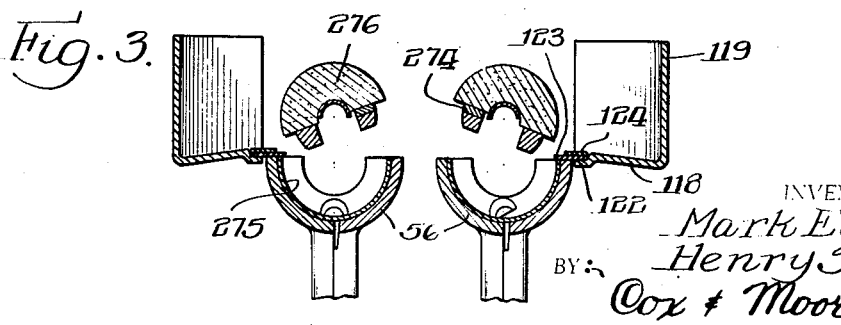
Fig. 3 is a transverse section taken on line 3—3 of Fig. 1.

The chute 116 has a supporting arm 117 keyed or secured in a suitable manner on shaft 109. A platform 118 having a vertical side wall 119 and an inclined surface 120 is secured to the outer end of arm 117 by screws 121. The platform 118 and the surface 120 are inclined downwardly from their inner edge to the side wall 119 as illustrated in Figure 3. The inner edge of platform 118 is pressed out to form a recess 122 to receive peel retaining means in the form of a rubber retaining flap 123 and clamping plate 124. The flap 123 is clamped between plate 124 and recess 122 by screws 125. Slots 126 in plate 124 allow transverse adjustment to compensate for wear on the plate 124.

Frame member 24 supports a fixed cam 127 (see Figures 1 and 5) having two vertical slots 128 and 129 in alinement with an abutment 131 therebetween and an interconnecting offset slot 130, shown in Figure 5.

As shown in Figures 2 and 6, arm 66 of vertically reciprocating yoke 64 is apertured and tapped to receive shanks of bolts 132. A foot 133 of a coring apparatus supporting bracket 134, Figure 6, is clamped between the arm 66 and heads of bolts 132. A keyway 135 in the under side of foot 133 fitting on a key in the arm 66 alines the bracket 134 with the receptacles 56. The bracket 134 has a transverse arm 136 reenforced by a web 137. The free end of bracket 134 supports a rectangular open frame 138. Four vertical bosses 139, 140, 141, and 142 are integral with the corners of the rectangular frame 138. The bosses 139, 140, 141, and 142 are drilled to provide slidable bearings for vertical supporting posts 143, 144, 145, and 146. Collars 147 by means of pins 148 are secured to the upper ends of posts 143, 144, 145, and 146.

A bracket 149, see Figures 2, 4, 6, and 8, is bolted to the frame 138 between the bosses 141 and 142. The bracket 149 is apertured to receive a pin 150 which extends out from both sides of the bracket 149. An H-shaped link 151 has apertures in two opposite legs 152 to fit about the pin 150 in each side of the bracket 149. The other end of link 151 has arms 153 apertured to receive a shaft 154. A cam roller 155 is mounted on the shaft 154 between arms 153 of link 151. The shaft 154 extends equal distances from both sides of link 151 and supports a U-shaped lever 156 and a double V-shaped lever 157. Link 151 keeps the shaft 154 and its associated parts in alinement with frame 138.

The U-shaped lever 156 (see Figures 4 and 7) is provided with apertured hubs 158 to pivot freely on the outermost ends of the shaft 154. The open ends of lever 156 have rectangular, slotted bosses 159 slotted longitudinally at 160 to receive the posts 143 and 144. The bosses 159 contact the under surface of collars 147 on posts 143 and 144. The closed end of lever 156 acts as fulcrum and is apertured at 165 to receive a square headed bolt 161. The shank of bolt 161 is smaller in diameter than the aperture 165 to provide an allowance for tilting of the lever 156. An adjusting thumb nut 162 is threaded onto the bolt 161 and comes to rest on the closed end of the U-shaped lever 156. The square head of bolt 161 is positioned between ears 163 extending from the bracket 149. A pin 164 pivotally secures the head of bolt 161 to the ears 163.

The double V-shaped lever 157 (see Figure 4) is provided with apertured hubs 166 to pivot freely on the shaft 154 between the arms 153 of link 151 and the hubs 158 of lever 156. The ends of the larger V-portion of lever 157 terminate in rectangular bosses 167 slotted longitudinally at 168 to receive the posts 145 and 146. The bosses 167 contact the under surface of collars 147 on the posts 145 and 146. Slots 168 allow lateral movement of the lever 157 relative to the posts 145 and 146. The bosses 167 are connected together and reenforced by a web 169. The vertex of the larger V-portion of lever 157 is contiguous with the hubs 166. The ends of the smaller V-portion of lever 157 are contiguous with the hubs 166 and the vertex of the smaller V-portion is apertured at 170 to receive an elongated threaded rod 171 which is smaller in cross section than the aperture 170 to allow tilting of the lever 157. An adjusting thumb nut 172 is threaded onto the rod 171 and rests on the vertex of the smaller V-portion of lever 157. The lever 157 fulcrums on the rod 171 under the nut 172. The rod 171 is reduced in diameter and threaded on its lower end. A boss 173 midway between bosses 139 and 140 on frame 138 is tapped to receive the reduced end of rod 171.

A box 174 (see Figure 8) on the head of bracket 149 is drilled and tapped to receive the shank of a square headed bolt 175. A lock nut 176 clamps a U-shaped spring retaining bracket 177 to the boss 174. Arms 178 of the bracket 177 are provided with horizontal circular pads 179. Adjusting thumb screws 180 are threaded through central tapped holes in the pads 179 and have on their ends coil spring locating washers 181. Coil springs 182 are positioned between the washer 181 and the collars 147 on posts 145 and 146. The thumb screws 180 adjust the pressure of the coil springs 182 against the collars 147. Posts 145 and 146 protrude slightly above the collars 147 to position the lower end of coil springs 182.

A shallow V-shaped spring retaining bracket 183 on rod 171 retains coil springs 184 against washers 147 on posts 143 and 144 (see Figure 8). The lower ends of springs 184 are held in position by the posts 143 and 144 protruding through the washers 147 and on the upper end by bosses 185 on the ends of bracket 183. The pressure of the springs 184 against the collars 147 is adjusted by a nut 186 on rod 171, bearing against the bracket 183.

Two bearing brackets 187 and 188 on frame 138 between the bosses 139 and 141 and the bosses 140 and 142 support a transverse cam shaft 189 directly below the shaft 154 (see Figure 12). A cam 190 having a low camming surface 191 and a higher camming surface 192 is keyed on the cam shaft 189 directly under the cam roller 155. A lever 193 is keyed on the cam shaft 189 to the outside of bearing 187. The end of lever 193 has a slot 194 to receive a bolt 195 from the universal joint 84. The bolt 195 is positioned in the slot 194 to give the proper throw to lever 193 and locked in place by a nut 186.

An H-shaped lever 197, shown in Figure 12, is keyed on the cam shaft 189, the upper extensions of the lever 197 being to each side of the cam 190. The depending legs of the lever 197 are apertured to receive pins 198. A pair of links 199 are pivotally mounted on the pins 198.

As seen in Figure 10, the bosses 141 and 142 are enlarged along the frame 138 to provide bearings 200 and 201 for a fulcrum shaft 202. Tripping fingers 203 and 204 having a turned-in portion 205 and a hammer end 206 are keyed on the ends of shaft 202. The finger 203 has a tapped hole 207 for a bolt 208. The bolt 208 extends through an arcuate slot 209 in cam roller arm 210. The arm 210 is free to rotate on shaft 202 and has in one end a slot 211 for adjustably positioning cam roller 22 mounted upon a bolt 213 which protrudes through the slot 211 and is locked in place by a nut 214 on the bolt 213. The cam roller 212 rides within the cam slots in the fixed cam 127 on frame member 24. The throw of the tripping fingers 203 and 204 is adjusted by tightening the head of bolt 208 against the arm 210 in the desired position.

A pair of cutting and ejecting devices are suspended on the posts 143, 144, 145, and 146, as seen in Figure 8. The left hand cutting and ejecting assembly is suspended on the posts 143 and 145. The right hand cutting and ejecting assembly is suspended on posts 144 and 146. As both right and left hand assemblies are identical in shape, construction, operation, and function except in a reverse manner, only the right hand assembly will be described with the understanding that the description and reference numerals used will apply equally well to both right and left hand assemblies. Post 145 has a tongue 215 apertured to receive a pin 216. The pin 216 supports one end of a casting 217. The other end of casting 217 is supported on a pin 218 from a tongue 219 on the lower end of post 143. The casting 217 comprises at the front end a bearing housing 220 having ears 221 and 222 apertured to fit on the pin 216 on each side of the tongue 215. A stud 223 extends inwardly from the bearing 220. The rear end of casting 217 has a semi-circular bearing block 224 provided with upright ears 225 and 226. As seen in Figure 4, a web 227 between the ears 222 and 226 maintains the casting 217 in a right-angular position. Bearing block 224 has flanges 228 apertured and tapped for reception of bolts 229 from a bearing cap 230.

As seen in Figure 8, a sleeve 231 is positioned in a horizontal bore 232 in the bearing housing 220. The inner end of sleeve 231 has a flange 233 bearing against the housing 220. A collar 234 is pinned on the other end of sleeve 231 to prevent axial movement of the sleeve 231.

The collar 234 also acts as a detent for the sleeve 231 which carries a fruit discharging paddle. The collar 234 has two tangential flat surfaces 278 and 279 and a diametrically opposed tangential flat surface 280, as shown in Figure 7. Two spring pressed plungers 281 and 282 cooperate with the flat surfaces 278, 279, and 280. The plunger 281 is held in position over the collar 234 by a bracket 283 secured to the casting 217, and the plunger 282 is held in position under the collar 234 in a radial bore 284 in the bracket 237.

The sleeve 231 has a central longitudinal bore 235 for a shaft 236 (see Figure 8). The shaft 236 is supported at the front end by a bearing 239 of bracket 237 secured to a boss on the bearing housing 220 with screws 238. A bevel pinion 240 keyed to the shaft 236 has a sleeve 241. A key 242 extends radially from the end of the sleeve 241 within a cut-out segment between shoulders 243 and 244 (Figure 7) of collar 234. Bevel pinion 240 meshes with a bevel gear segment 245, the hub of which is held on the stud 223 by a cap disc 246. The cap 246 is secured on the end of stud 223 by a screw 247. The gear segment is provided with a boss 248 having a tapped opening for a thin-headed bolt 249. One end of the link 199 is pivotally mounted on the bolt 249 between the boss 248 and the head of bolt 249.

The flange 233 (see Figures 8 and 14) of sleeve 231 has a cup-shaped extension 250 and vertical flanges 251. The flanges 251 continue into a pair of opposed blades 252 of a fruit paddle leaving a throat 253 therebetween. The throat 253 is enlarged at 254. The ends of the blades 252 terminate in a common hub 255 supported between the bearing block 224 and the bearing cap 230. One of the blades 252 is recessed at 256. The rear end of shaft 236 has a central circular cavity 257 for the adaptation of a coring spoon blade 258 which extends into the throat 253 between the blades 252 of the fruit paddle. The coring spoon 258 is reinforced within the cavity 257 by a plug 259. A set screw 260 threaded through the blade 258 and into the plug 259 has a head projecting through an elongated slot 261 in the shaft 236. The coring spoon blade 258 is generally semi-circular in cross section having an enlarged or bulging section 262. The rear end of the blade 258 is positioned by a floating sleeve 263 having a flange 264. The sleeve 263 is held within a longitudinal bore 265 in the hub 255 by a flat spring finger 266 anchored to the bearing cap 230 by a bolt 267.

The flanges 251 from the sleeve 231 are tapped for the reception of threaded shanks of stud screws 268. The heads of the stud screws 268 provide pivots for an ejector 269. The ejector 269 comprises ears 270 and 271 having vertical extensions 272 interconnected by an abridging trigger plate 273. The ear 271 has a rearwardly projecting finger 274 at right angles to the plate 273. The ejecting finger 274 lies within the recess 256 in its normal position and conforms to the outline of the blade 252.

*Operation*

In the operation of the above described machine, a half section of a fruit having a peel 275 severed from the body 276 lies within a receptacle 56 with its severed flat face exposed upwardly in a horizontal plane previous to the operation about to be explained.

As the power to operate the various mechanisms originates at a central source the mechanisms will function in timed relation with the main turret and in unison with each other. Preferably during a period of rest of the main turret, the whole fruit at station A will be bobbed (stem end removed) and split in half, the halves being deposited in paired receptacles, while at station B the peels are being severed from the body of the fruit. Concurrently at station C the core is being severed from the body of the fruit. In unison with the three previous operations, a scavenging blade at station D removes peels and cores from the receptacles. At the next cycle of the operation the various devices return to their initial or starting positions. During this return stroke the ejecting mechanism at station C ejects the treated fruit from the machine and in unison the scavenging blades at station D eject the peels and cores. At the same time the main turret rotatively advances one quarter of a turn or ninety degrees about a fixed center. Thus the paired receptacle from station A with halved fruit therein reaches station B; the paired receptacles from station B with the peel severed from the body therein reach station C; the paired receptacles with peels and cores therein reach station D; and the paired receptacles from station D, free from fruit and refuse, reach station A ready to renew the cycle. Thus it will be seen that every movement and moment is utilized in the production of treated fruit.

To accomplish the previous results, power from a suitable source drives the pulley. This pulley shown at the left in Figure 2, imparts rotative movement to the cam shaft 36. Bevel gear 37 transfers the rotative movement to stud shaft 39 by the bevel pinion 38. The arm 41 on stud shaft 39, by means of the cam roller 42 thereon intermittently rotates the Geneva gear 45 by engaging the radial slots 46 therein. The main turret 50 by means of the sleeve 47 intermittently rotates with the Geneva gear 45, bringing the receptacles 56 with halved sections of fruit therein into position under the coring and ejecting devices.

Inasmuch as the main features of the present invention take place at the seed severing station, the remaining description of operation will be mostly confined to the operation of the seed severing and fruit discharging mechanism. It is understood that this mechanism is not dependent upon the construction recited regarding previous operations performed upon the fruit other than the presentation of a half fruit to the seed severing station.

Concurrently and in timed relation with the advancement of the main turret 50, cam roller 59 in the cam track 58 of face cam 57 keyed to cam shaft 36 reciprocates the cam follower plate 61 in a downward direction. The yoke 64 being secured to the cam follower plate lowers the coring head by means of the coring head supporting bracket 134 causing it to approach at right angles onto the receptacles 56 with the flat fruit engaging face of the coring paddles exposed downwardly in a horizontal plane. The coring paddles are held in such position by the spring pressed plunger 281 engaging the flat surface 278 of collar 234 and the spring pressed plunger 282 engaging the flat surface 280 of collar 234. A concentric path of the cam track 58 maintains the coring head in this position during the coring operation.

Concurrently and in timed relation with the lowering of the coring head on to the receptacles, the peel retaining and discharging chutes are lowered onto the receptacles by the cam 86. It will be noted that these chutes at 125 carry the means for retaining the peels in the cups during the discharge of the peeled fruit from the cup. To this end the peel retaining means comprising in the present instance the rubber flaps 123 are mounted directly upon these shiftable chutes so that when the chutes are lowered onto the receptacles the rubber flaps rest on the top of the cup with the inner edge of the flap slightly overlying the edge of the peel in the cup. By means of this construction when the chutes are raised the rubber flaps are lifted from the cups to permit the cups to move to the next station and to permit the next succeeding cups positioned to replace those cups which have moved on. The cam 86, keyed to the cam shaft 36 reciprocates the cam roller 88 in a downward direction by means of the cam track 87. The cam follower plate follows the cam roller and carries with it the rack bar 93 for actuating the scavenging mechanism. The movement of the rack bar 93 is carried out by means of the bracket 91 on the downward reciprocating motion. Rack teeth on the bar 93 impart a counter-clockwise rotation, as shown in Fig. 2, to the pinion 96 keyed on the shaft 97. Plate cam 98 on this shaft rotates with the pinion 96, bringing the low camming surface 99 under the roller 102. The roller 102 dropping onto the low camming surface rocks the shaft 109 by means of lever 106. The spring 115 on the lever 106 keeps the roller 102 in constant engagement with the cam 98. Chutes 116, through the instrumentality of arm 117 to which they are attached, are swung downwardly to a position where they are arrested by coming into engagement with receptacles 56. As before stated, in this lowered position the rubber laminated flaps 123 rest on the receptacles in an effective position maintaining the concave edge of the projecting flaps slightly over the inside periphery of the receptacles sufficiently to engage the edges of the peels 275. This is shown clearly in Fig. 3.

Directly after the peel retainer and coring head come into effective position, the coring of the halved sections of fruit occurs. In this operation the cam track 67 in the cam 57 imparts a rearwardly reciprocating motion (see Fig. 1) to cam follower by means of the cam roller 68. This motion is transferred into a counter-clockwise rocking motion to the rocker shaft 78 by means of arm 76 and link 75. The shaft 78 swings the arm 82 around, pulling with it the connecting rod 85 and the universal joints 83 and 84. The bevel gear 245, through the linkage 199, lever arms 197 and 193 on shaft 189, is oscillated in a counter-clockwise manner imparting a counter-clockwise rotation to the shaft 236 and the coring spoon 258 through the bevel pinion 240. Thus the coring spoon severs the core from the fruit body during 180° rotation of the bevel pinion 240. Continued rotation of this beveled pinion brings the key 242, see Fig. 7, on pinion 240 into engagement with the shoulder 244 on the collar 234 keyed to sleeve 231, which carries the coring paddle. Thus the coring spoon and fruit removing paddle rotate in like manner, together.

It will thus be seen that we have provided a driving mechanism for the coring device and paddle which eliminates the necessity for constant adjustment which was present in the prior friction driving construction disclosed in prior Ewald Patent No. 2,161,807. In these prior constructions the friction supplied the tension to hold the paddle upon the face of the fruit while the coring spoon was cutting through the flesh of the fruit and when these friction elements got wet from the juice of the fruit and subsequently dried the sugar on the frictional elements on drying ruined the friction surface so there was no uniform tension. On the contrary, in the present invention this frictional driving construction is eliminated.

It will be noted that we have thus provided positive means for driving the fruit face contacting and fruit discharging means, in the present instance the paddle 274, positively and directly from the shaft 236 by means of the key 242 and the opposed shoulders 243 and 244. We have also provided a simple means for insuring a delayed action or lost motion direction in this driving mechanism so that the coring means may operate independently of the paddle to core the fruit and then when the key 242 contacts the shoulder 243 the positively driving connection will come into action, positively to drive the paddle by and together with the coring means whereby the paddle and coring means rotate as a unit during the inversion of the paddle for the purpose of dumping the severed core into the cup on top of the peeling retained therein and for inverting the severed fruit to a substantially diagonal position as shown in Fig. 3 whereby the ejector mechanism 274 may thereafter operate to eject the fruit sidewise into the chute as hereinafter explained. During the periods of time when the seed severing mechanism is operating alone, it will be noted that the friction members 281 and 282, by reason of their contact with the flat surfaces on the collar 234, will serve frictionally to hold the paddle from turning movement. By reason of this friction it will be apparent that when the shaft 236 reverses its direction of turning and the key 242 comes into contact with the opposite shoulder, the direct drive will overcome the friction and will force the paddle to rotate with the seed cutting mechanism.

With regard to the resilient mounting of the carriage on which the coring means and fruit contacting members are mounted, it will be noted that the springs 182 and 184 at the four corner posts resiliently press downwardly upon the collars 147 which are pinned to the posts 143, 144, 145, and 146 and that upper ends of these collars are confined by the spring retaining brackets 177 and 183 which are provided with suitable adjusting means for adjusting the pressures of these four springs independently of one another. It will thus be seen that the fruit turning and fruit discharging devices are resiliently carried on the vertically reciprocating carriage so as to be brought yieldingly into contact with the cut face of the half fruit. It will also be appreciated that this resilient downward pressure of the coring means and the turning paddle is augmented at one end of the half fruit, preferably the blossom end of the fruit, when the mechanism is acting upon half pears, whereby the weight of the carriage for the paddle and coring mechanism provides additional downward pressure on the butt end of the fruit to counteract the reaction of the coring spoon during the coring operation and whereby the springs at the other or opposite end of the coring carriage counteract the reaction of the spoon at this end.

It will be further noticed that, due to the reciprocating carriage upon which the paddle and coring spoon is mounted, the coring paddles approach the fruit generally at right angles to the fruit surface to be contacted in contrast to a tilting diagonal approach of former constructions of Ewald Patent No. 2,161,807 where pivoted paddles were provided. In addition, it will be noticed that we have provided a yielding approach of the paddles to the face of the fruit at both ends of the fruit. This is due to the slide rod construction and mounting of the paddle mechanism thereon. Furthermore, we have utilized the weight of the carriage for the paddle and coring mechanism to provide sufficient downward pressure on the butt end of the fruit to counteract the reaction of the coring spoon, and we have provided springs on the neck end of the carriage so as to give a yielding downward pressure on the neck or opposite end of the fruit whereby to provide a yieldable pressure to take up variations in the thickness of the fruit at this point, and in the case of pears and similar shaped fruit to provide a yieldable downward pressure to take up variations in the thickness of the neck of the pear where such variations are the greatest. In short, we have provided a coring mechanism which provides a uniform pressure downwardly on the face of the fruit while coring, including in particular a pressure due to the downward weight of the carriage at one end of the fruit, in the case of a machine adapted for the coring of pears, at the butt or blossom end of the pear and have provided a downward yielding spring pressure at the neck or opposite end of the pear.

Furthermore, it is evident that by reason of this construction we have likewise provided a cross head carrying the fruit paddles and the coring spoon which are timed to raise and lower synchronously with the movement of the turret and the cups. Likewise we have provided by reason of the right angled approach of the paddle, a yielding uniform pressure downwardly upon the cut surfaces of the fruit. We have found that this gives an improved coring operation, providing a complete and clean-cut uniformity of the fruit, and particularly when the machine is used for treating pears, a clean cut particularly at the stem end of the pear as heretofore the coring at the stem end was not as positive as at the blossom end due to the utilization of a diagonally approaching, pivoted motion imparted to the paddle. In addition, by mounting the paddle and coring cross head directly on the peeling cross head slide for vertical reciprocation therewith, we have provided a construction wherein the same mechanism that operates the peeling device also operates the coring device.

Immediately prior to the rotation of the fruit removing paddle 254, a slight lift is given to the paddle and coring spoons to prevent any bruising or crushing action that may be caused by the spring pressure of the paddles and coring spoon against the fruit body. Claims to the foregoing feature are set forth in the pending application of Mark Ewald, Serial No. 637,708, filed October 14, 1932. In order to carry this out the raised concentric cam surface 192 of cam 190 keyed to cam shaft 189 comes into effective position raising the roller 155 on the shaft 154 (see Fig. 12) a slight distance. The levers 156 and 157 raise therewith. The lever 156 is fulcrumed by the thumb nut 162 and has the bosses 159 on the free ends of the lever in contact with the collars 147 on posts 143 and 144. The distance between the shaft 154 and bosses 159 is twice as great as the distance between the shaft 154 and fulcrum point 162. Thus the lift of the free ends against the action of springs 184 is substantially four times as great as the lift of shaft 154. The lever 157 is fulcrumed by the thumb nut 172 having its bosses 167 on the free ends in contact with the collars 147 on posts 145 and 146. The dimension between the shaft 154 and the center line of posts 145 and 146 is equal to the dimension between the shaft 154 and fulcrum point 172. Thus the lift of the free ends against the action of spring 182 of lever 157 is substantially twice as great as the lift of shaft 154.

The posts 143 and 144 suspend the rear ends of the paddles over the small ends of halved sections of fruit and front ends of the paddles are suspended over the large ends of the fruit by posts 145 and 146, particularly in the case where the machine is operating on pears. It is understood, of course, that the operation of the machine is not restricted to pears. Thus, the ends of the paddles over the smaller ends of the fruit, such as pears when the machine is operating on pears, will be lifted twice the amount of the lift of the ends of the paddles over the opposite ends or larger ends of the fruit when the machine is operating on pears. The reason for the greater lifting of the paddles on the smaller end of the pears is that in order to place the pears, which vary considerably in size, particularly at the neck end, in standardized sizes of cups the pears are sorted according to the size of the greatest diameter at the larger end and in each and every such selected sorted size there is a greater variation in size of the smaller ends. For instance, in any size of sorted pears there is a variation of $\frac{1}{4}''$ in maximum diameter at the larger end but there generally is a variation of $\frac{3}{4}''$ at the smaller ends. Therefore, in order to compensate for the greater variations in size of the fruit of the small ends as when treating pears, we compensate for this by providing a greater ratio of lift of the paddles at this end as compared to the lift of the paddles at the large end.

Referring now to the action of the paddles upon the flat face of the cut fruit, when the paddle begins to turn the fruit about in the fruit holder the edge of the peel engages the rubber peel retainer, as shown in Fig. 3, arresting further movement of the peel, the fruit paddle and coring spoon continuing to rotate for approximately 70° where further rotation is arrested by the cam track 67, which cam track is shown in Fig. 2 of the drawings. When the coring spoon is in this diagonally disposed, inverted position the core will generally drop back into the receptacle. With the coring spoon and paddle held in this diagonal position the cam track 58 through associated parts lifts the coring head with the bodies of cored and peeled fruit upon the upturned faces of the coring paddles to the position shown in Fig. 3. The coring paddle is held in this position by the spring pressed plunger 281 and 282 engaging the flat surfaces 280 and 279, respectively. At this stage the roller 212 of the ejecting means, see Fig. 5, strikes the abutment 131 in the fixed cam 123 causing the hammer ends 206 on the tripping fingers 203 and 204, see Figures 8 and 9, to strike sharply against the plate 273 of ejectors 269. The ejector 269 is shown in its effective position in Fig. 9.

The coring head continues its upward motion, returning ejectors 269 to normal position due to the roller 212 entering the cam slot 129 in the fixed cam 123. Concurrently with the rising travel of the coring head the rotation of the bevel gear segment 245 reverses by means of the cam track 67 of cam 57, returning the coring paddle and spoon to their respective positions, that is, with the flat engaging surface of the paddle exposed downwardly and the coring spoon inverted. During the latter rising position of the coring head, the discharging chute is tilted to the position shown in Figure 13. This position is attained by dropping the cam track 87, see Fig. 2, reversing the direction of the actuating mechanism previously described for lowering the chute upon the receptacles. The chute in this position projects fruit therefrom onto a conveyor or other suitable device and permits the fruit holders, such as the cups on the turret, to pass therebeneath to the next cycle of operation.

It will be appreciated from the foregoing description of the manner in which the coring paddles are inverted to a diagonal position that a much gentler ejection of the fruit is afforded than in prior constructions because due to the diagonal inverted positioning of the paddle, the fruit is ejected laterally into an adjacent hopper which is positioned relatively close to the side of the cup, i. e., substantially overlying the open edge of the cup and so close that the hopper must be raised to move the cup. In fact, it might be said from one aspect the hopper into which the fruit is ejected, at the moment of ejection, is so positioned on the cup as to form substantially a removable portion of the fruit holder, that is, the cup. By reference to Fig. 3 it will be noted that in the utilization of this diagonal positioning of the paddle 274 with the half fruit superimposed thereon, the coring spoon materially assists the paddle in maintaining the fruit on the paddle for the ejecting operation in the manner shown in Figures 9 and 15. With regard to the hopper itself, when it has been positioned upon the fruit holder shown in Fig. 3 to receive the fruit ejected from the paddle as before described, the fruit is then discharged into the hopper which then tips forwardly to cause the fruit to slide or flow outwardly of the machine in the manner substantially illustrated in Fig. 13. The hopper in this tipping movement also clears the fruit holders to permit their movement and at the same time clears the peel detaining flaps from the fruit holders or cups 56.

With regard to the driving mechanism for the rotating coring spoon and paddles, it will be noted that the same is mounted between a pair of paddles and comprises a linkage mechanism actuated from the same shaft as that driving the peeling and coring mechanism and which linkage mechanism in turn drives the segment mitred gear and the mitre pinion. It will also be noted that the ejecting mechanism for the paddle device is carried out when the cross head is raised substantially above the cup and substantially above the receiving hopper.

Figure 14:
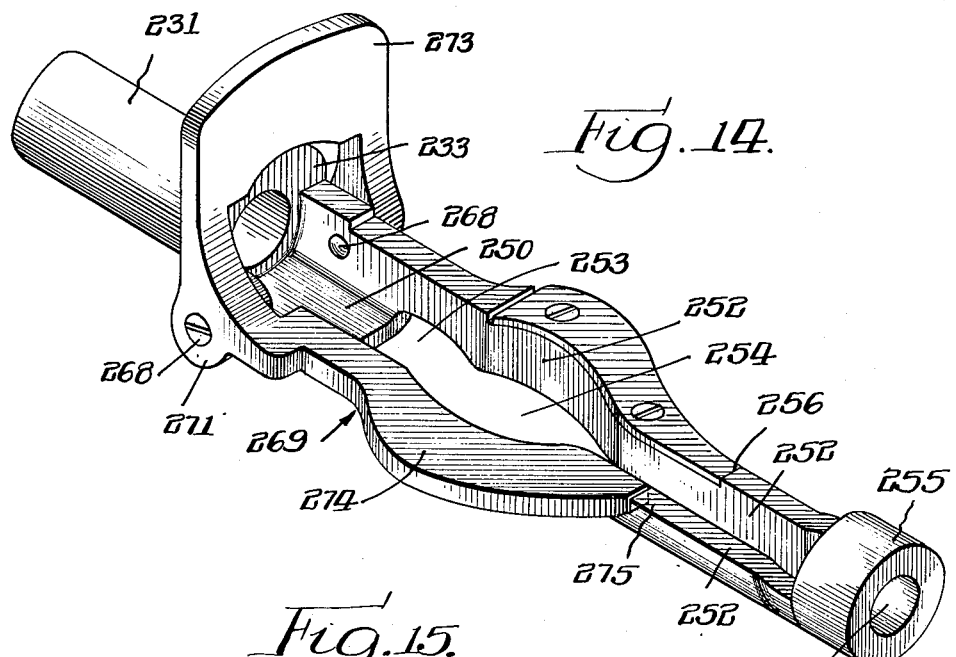
Fig. 14 is a perspective view of the improved fruit ejector and paddle mechanism.
Figure 15:
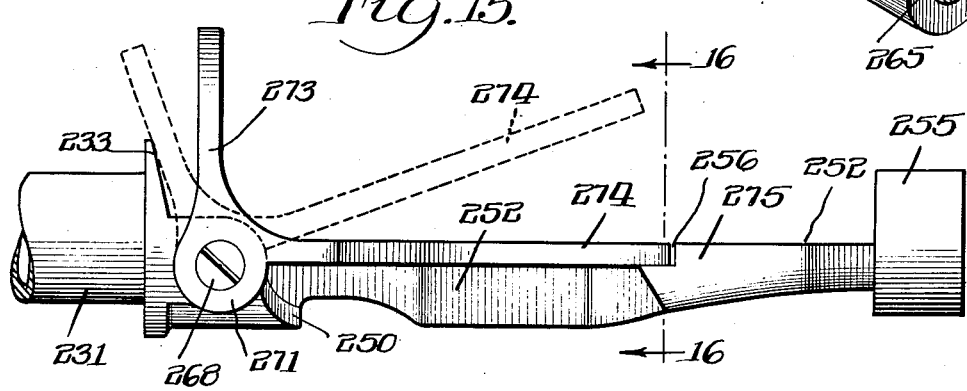
Fig. 15 is a side view showing the ejecting movement of the ejector.
Figure 16:
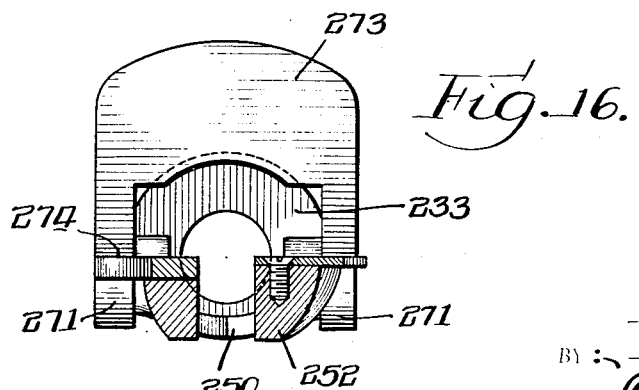
Fig. 16 is a section taken on line 16—16 of Fig. 15.

In the adaptation of the machine and inventions thereof for the coring and discharging of pears the arrangement of the ejector is such that the ejection occurs from the blossom end of the pear, the latter being ejected substantially diagonally and forwardly into the hopper. It will also be apparent that by using only one ejector, for which see Fig. 14, the pear or other fruit is given a somewhat rolling action or lateral ejection into the hopper. With particular reference to Figs. 14, 15, and 16, it will be noted that we have cut away one leg of the paddle at the point 275' to prevent the gathering of stems and other foreign matter between the paddle and the ejector. This provides a paddle with only one fruit holding surface but experience has shown that this is abundantly sufficient while at the same time eliminating objectionable clogging of the stems between the surface of the paddle and the overlying ejector.

The simple construction and arrangement of the vertical posts or sills for reciprocatingly supporting the vertically shifting cross head provides a most efficient construction for presenting the coring mechanism and the so-called paddles substantially at right angles to the face of the fruit whereby to insure the accuracy and cleanness of the cut and the presentation of the paddles with uniform pressure on the surface of the fruit. This feature is assured by the construction of the cross head carrying the four post bearings, there being two for each paddle.

The construction of the cross head which carries the shifting fulcrum mechanism is an especially advantageous arrangement. The cross head is provided with a transmission shaft and cam for operating the shifting fulcrum levers which give the variant lifting positions to the paddle mechanism—greater raising movement to the paddle at the neck end than at the blossom end. In addition, this mechanism provides a very rigid mounting for the paddle and core driving mechanism and the arrangement is most compact, may be assembled as a unit on the machine, and synchronously operated together with other instrumentalities of the machine from a common driving mechanism. In addition, by means of the spring and weight arrangement of the cross head construction and shifting levers, a uniform downward, substantially uniform pressure is imparted to the paddle to press it onto the face of the fruit.

What we claim is new and desire to secure by Letters Patent of the United States is:

1. In a fruit processing machine the combination of means providing a frame, a fruit holder movable on said frame in a horizontal path and adapted to have a half fruit positioned therein with the cut face uppermost, seed section severing mechanism, means for vertically reciprocating said seed severing mechanism including spaced apart mountings, one for each end of the seed severing mechanism and means for reciprocating said mountings including means for causing the seed severing mechanism to yield at each end independently of the other end of the mechanism as the mechanism approaches and contacts the face of the fruit.

2. In a fruit treating machine the combination of a fruit holder adapted to position a half fruit with its cut face uppermost, a coring device for said fruit, a mounting including spaced bearings for the opposed ends of said coring device, said mounting being of substantially greater weight at one end than at the other, means for producing a relative approaching movement between said mounting including the coring device and said fruit holder, means actuated by the weight of the heavier end of said mounting and including resilient means for causing said coring device resiliently to contact the face of the fruit with greater force at the heavier end of the mounting and resilient means for causing the yieldable pressure of said device on the face of said fruit at the other end of the mounting.

3. In a device for coring pears, the combination of a frame having a movable fruit holder thereon adapted to receive a half fruit with its cut face uppermost, means for moving the fruit holder, a coring carriage vertically reciprocable in said frame, and means for imparting vertical movement to said carriage to cause its approach toward and away from the path of movement of said holder, an elongated coring mechanism having its ends mounted in spaced bearings on said carriage, said carriage including means whereby the weight of said carriage provides sufficient downward pressure of the coring mechanism on the butt end of the fruit to counteract the reaction of the coring mechanism during the coring operation, and spring means associated with said carriage and said coring means providing a yielding downward pressure of the coring mechanism on the neck end of said fruit, said yieldable pressure being provided to form adjustment for variations in the thickness of the necks of fruit.

4. In a fruit treating machine, the combination of a frame, a fruit holder for elongated fruit movably mounted thereon and adapted to hold a half such fruit with its cut face uppermost, a coring carriage on said frame, coring mechanism including an elongated coring cutter having its opposed ends mounted in opposed portions of the carriage and parallel to the face of the half fruit, means for shifting the carriage, means actuated by the weight of the carriage for holding one end of the coring mechanism by the weight of the carriage in contact with the face of the fruit and spring means for resiliently pressing the opposite end of the coring mechanism in contact with the face of the fruit.

5. In a device of the class described, the combination of an upright frame forming a vertical slide, a turret centrally disposed on said frame for rotation thereon, said turret carrying an endless series of spaced fruit holders, a main drive shaft having operating means thereon, a cross head vertically reciprocating in said slide, connections from said operating means to vertically reciprocate said slide, said slide having at its upper end a peeling mechanism support, said slide having an upper extension provided with an inwardly extending arm above said first mentioned peeling mechanism support, a carriage mounted on said extension for overlying the fruit holder, coring mechanism mounted on said carriage whereby upon vertical reciprocation of said slide said coring mechanism is raised and lowered relatively to said fruit holder, a vertical shaft having its bearings in said frame, a reciprocal connection from said operating means for oscillating said vertical shaft in synchronism with the raising and lowering movement of said slide, said shaft having a connection to said coring mechanism including means for actuating a movable portion of said coring mechanism to cause the coring of the fruit in the fruit holder when said coring mechanism has been vertically shifted to bring the same into contact with the cut face of said fruit.

6. In combination, a frame, a plurality of fruit holders mounted in spaced relation on said frame, means for shifting said fruit holders, said fruit holders having means to receive a peeled fruit therein with the loose peel lying therearound, fruit discharging means mounted on said frame for movement relatively toward and from said fruit holding means, means for shifting said fruit discharging means relatively toward and from said fruit holder, shiftable means for receiving the fruit discharged by said discharging means, peel retaining means mounted on said receiving means, and means for positioning said receiving means and said peel retaining means adjacent said fruit holder whereby said peel retaining means overlies a portion of the peel during the fruit discharging operation, and means for actuating the fruit discharging means for ejecting the fruit from the fruit holder, said peel retaining means serving to retain the peel in the holder.

7. In a fruit treating apparatus the combination of a frame, fruit holding means adapted to receive a half fruit therein, means to position said fruit holder at a fruit discharging station, means for discharging the fruit from said fruit holder, means for positioning said fruit discharging means relatively adjacent said fruit holder, a chute, means for positioning said chute adjacent the fruit holder to receive the fruit discharged therefrom, and means to shift said chute to permit the unobstructed movement of said fruit holder away from said discharging position.

8. In a fruit treating machine the combination of a frame, a succession of fruit holders adapted to receive a half fruit therein with the peel in natural position thereon but severed therefrom, means forming a fruit discharging station including a fruit discharging member adapted to operate in relation to a fruit holder when at said station, means to actuate said fruit discharging member to discharge the peeled fruit from said holder, a chute, means for shifting said chute to move the same adjacent said fruit holder to receive the fruit discharged therefrom, peel retaining means mounted on said chute and adapted to overlie a portion of the fruit holder to retain the peel in the fruit holder upon the ejection of the fruit therefrom, and means adapted to shift said chute and said peel retaining means away from said fruit holder upon the termination of the discharging operation to permit the presentation of a successive fruit holder to said discharging station.

9. In a fruit treating machine the combination of a frame, a series of substantially cup-like fruit holders mounted in spaced relation on said frame, means for moving said fruit holders intermittently to present each one to a fruit discharging station, fruit discharging means adapted to be presented to each one of said cups in succession and including means for ejecting the fruit therefrom, each fruit in said cup having the peel severed therefrom and lying in natural position thereon, a chute having a substantially horizontal portion and an upstanding portion, means for moving said chute to present the horizontal portion substantially to form an extension of the periphery of said cup, means on said horizontal portion adapted to overlie a portion of the peel during the fruit discharging operation whereby said peel will be retained in the cup, and means operable subsequent to the operation of the discharging mechanism for shifting said chute away from said cup whereby to dump said fruit from said chute and whereby to move the horizontal portion of said chute from said cup to permit the movement of the next successive cup to subsequent fruit discharging position.

10. In a fruit treating machine the combination of a frame, a fruit holder mounted on said frame having means to receive a half fruit with its cut face uppermost, coring and discharging mechanism for the fruit including a substantially rectangular carriage, means for shifting said carriage vertically on the frame to move the same toward and from the fruit holder, said carriage having bearings, one at each of its four corners, a post vertically slidable in each of said bearings, a collar on each post, a bracket rigidly mounted on said carriage, a lever pivoted on said bracket and having an arm extending inwardly of the carriage, a shaft on said arm, a pair of levers pivoted on said shaft and each lever having an extending pair of arms extending in opposition to the arms of the other lever and on opposite sides of the shaft, each of the arms of a lever having portions underlying a collar on the post and means on said carriage forming a fastener for the opposite end of each lever, means for actuating said shaft, spring means normally depressing each of said posts and a pair of combined fruit contacting and discharging mechanisms and seed severing means carried by the lowermost portions of said posts and means for turning said fruit contacting and discharging mechanism and said seed severing means both independently and together.

11. In a fruit treating machine the combination of a frame, a fruit holder mounted on said frame having means to receive a fruit with a cut face uppermost, coring and discharging mechanism for the fruit including a substantially rectangular carriage, means for shifting said carriage on the frame to move the same toward and from the holder, said carriage having bearings, one at each of its four corners, posts slidable at each of said bearings, a collar on each post, a bracket rigidly mounted on said slidable carriage, a lever pivoted on said bracket and having an arm extending inwardly of the carriage, a shaft on said arm, a series of levers mounted on each shaft and each underlying a collar for lifting a post, said system of levers including a shifting fulcrum mechanism, means for actuating said shaft, a spring normally depressing each post and a pair of combined fruit contacting and turning mechanisms and coring mechanism having opposed bearings carried by the lowermost portions of a pair of said posts and means for turning said fruit contacting and discharging mechanism and said coring mechanism both independently and together.

12. In a fruit treating machine the combination of a frame, a fruit holder mounted on said frame having means to receive a fruit with a cut face uppermost, coring and discharging mechanism for the fruit including a substantially rectangular carriage, means for shifting said carriage on the frame to move the same toward and from the holder, said carriage having bearings, one at each of its four corners, posts slidable at each of said bearings, a collar on each post, a bracket rigidly mounted on said slidable carriage, a lever pivoted on said bracket and having an arm extending inwardly of the carriage, a shaft on said arm, a series of levers mounted on said shaft and each underlying a collar for lifting a post, said system of levers including a shifting fulcrum mechanism, means for actuating said shaft, a spring normally depressing each post and a pair of combined fruit contacting and turning members and coring mechanism having opposed bearings carried by the lowermost portions of a pair of said posts and means for turning said fruit contacting and discharging mechanism and said coring mechanism both independently and together, an ejector mechanism for said fruit contacting member and means actuatable from said shaft for actuating said ejector mechanism at predetermined times.

13. In a fruit treating apparatus the combination of a frame, a fruit holder shaped to receive a half fruit with the peel severed therefrom and lying in normal position on the fruit within the holder, the open face of the fruit lying uppermost, a combined coring and fruit discharging mechanism adapted to cooperate with the fruit in the holder to core and to discharge the fruit therefrom, comprising a mounting, means for producing relative motion between the mounting and the fruit holder, a bearing for said mounting including a substantially elongated sleeve, means adapted to contact the cut face of the fruit carried by said sleeve, a shaft within said sleeve, coring means rigidly mounted on said shaft and adapted to operate on the core of the fruit adjacent the fruit contacting means, means on the outer end of said sleeve having a plurality of tangentially flat surfaces, yielding friction plungers disposed on a stationary part of the frame and adapted to press on the tangential surfaces, means for reversely rotating said shaft and a lost motion driving connection between said shaft and said means for driving said shaft and means together at times and for driving said shaft alone while holding said means from turning by means of said friction elements.

14. In a fruit treating apparatus the combination of a fruit holder adapted to hold a half fruit with its cut face uppermost, a drive shaft, coring means rigidly connected thereto and adapted to be presented to the core portion of the fruit for coring the same, means for reversely driving said shaft at predetermined times, fruit contacting means adapted to contact the cut face of the fruit to turn the same to discharge the fruit from the fruit holder including a sleeve surrounding said shaft, said sleeve having a portion provided with angularly spaced shoulders, tn abutment on said shaft adapted to turn between said shoulders whereby to drive the fruit contacting elements positively, said sleeve having spaced apart portions thereon in predetermined angular position with relation to the shoulders thereof and friction means cooperating with said portions whereby to hold said sleeve stationary when not being positively driven by said shaft.

15. In a fruit treating apparatus the combination of means forming a bearing, a shaft rotatable therein, said shaft having a bore in its inner end, a plug in said bore, an opening in the wall of said shaft opposite said plug, a coring spoon having an opening in one end thereof inserted in the hollow of the shaft between its inner wall and said plug, fastening means inserted through the opening in said shaft, through the opening in the blade and into the plug, a second bearing spaced from the first, a hub therein, a sleeve in said hub having an aperture to receive an annular end of said spoon, said hub having a flange, and a leaf spring on said second bearing and having a depressed seat resiliently mounted in the open end of said spoon, said spring overlying the flange of said hub.

16. In a fruit treating device the combination of a fruit turning and discharging device comprising spaced sleeves, means for reversely turning the same, means connected to and disposed between said spaced sleeves comprising a substantially flat member adapted to lie contactingly on one side of the axis of turning said sleeve, said flat member adapted to contact the face of the fruit, a fruit discharging element comprising a second flat member adapted to lie on the opposite side of the axis of turning of said sleeves in substantial opposed relation to the first mentioned flat member and to lie in the common plane therewith for contacting another portion of the fruit on the opposite side of the axis of turning of the sleeve, said second mentioned flat portions being shiftable with respect to said first mentioned flat portion to constitute an ejector for said fruit.

17. In a fruit treating apparatus the combination of a frame, fruit holding means thereon for holding a half fruit with the cut face thereof uppermost, a carriage on said frame, cutting means to sever the seed section from the fruit and fruit contacting and turning means on said carriage, means for actuating the carriage to position the cutting means and fruit contacting means in position to act upon the cut face of the half fruit, means for actuating the cutting means to cut the half fruit, means for turning the half fruit to position it for ejection, ejecting means associated with said turning means, and means mounted on the shiftable carriage and brought into actuating position relative to the ejecting means for operating said ejecting means.

18. In a fruit treating apparatus, a frame, a fruit holder for holding a half fruit with its cut face uppermost, a carriage on said frame, means for shifting said carriage to bring it adjacent said fruit holder, said carriage providing spaced bearings, a fruit contacting means having portions adapted to contact the cut face of the fruit and turnably mounted in said spaced bearings, seed severing means turnably mounted in said spaced bearings, a fruit ejector shiftably mounted on said fruit contacting means and having a portion laterally projecting therefrom, an actuating member shiftably mounted on said carriage and adapted to be brought into association with said laterally projecting portion of said ejector, and means for actuating said ejector actuating mechanism in predetermined relation to the actuation of the fruit contacting means.

19. In a fruit treating apparatus the combination of a frame, a fruit holder thereon adapted to hold a half fruit with its cut face uppermost, a carriage vertically movable on said frame toward and from said fruit, means for shifting the carriage toward said fruit, means for contacting the cut face of the fruit, cutting means for severing the seed section from the cut face of the fruit, means for resiliently mounting the fruit contacting and cutting means on said carriage, and means for actuating the cutting means and the fruit contacting means after said carriage has been shifted into operative position relative to the fruit in said holder.

20. In a fruit treating machine the combination of a frame, a fruit holder thereon adapted to receive a half fruit with its cut face uppermost, a carriage vertically shiftable on said frame toward and from the cut face of the fruit, means for shifting the carriage toward the fruit, a second carriage mounted on said first carriage, fruit contacting and turning means and cutting means for severing the seed section from the fruit, both said means being mounted on said second carriage, said second carriage being constructed to provide greater weight at the butt end of the fruit in its holder than at the neck end, means for resiliently mounting said second carriage on the first carriage to cause the second carriage resiliently to urge the fruit contacting and fruit coring mechanisms yieldingly on the face of the fruit, and means for actuating the seed severing means and the fruit contacting means.

21. In a fruit treating apparatus, the combination of a frame, a fruit holder thereon adapted to hold a half fruit with its cut face uppermost, a carriage vertically movable on the frame, means for moving the same toward the cut face of the fruit, means for contacting the cut face of the fruit, seed section severing means, means for mounting the fruit contacting and seed severing means on said carriage, means for actuating the seed severing means to sever the seed section from the fruit, and spring means for providing a downward pressure on said carriage for counteracting the upward reaction due to the operation of the seed severing mechanism as it moves through the cut face of the fruit.

22. In a fruit treating apparatus, the combination of a frame, a fruit holder thereon adapted to hold a half fruit with its cut face uppermost, a carriage vertically movable on the frame, means for moving the same toward the cut face of the fruit, means for contacting the cut face of the fruit, seed severing means, means for mounting the fruit contacting and seed severing means on said carriage, means for actuating the seed severing means to sever the seed from the fruit, means for providing a downward pressure on said carriage for counteracting the upward reaction due to the operation of the seed severing mechanism as it moves through the cut face of the fruit, means for relieving said fruit contacting means from the face of the fruit after the seed severing operation, and means for actuating the fruit contacting means for shifting the cut fruit in the fruit holder to discharging position.

23. In a fruit treating apparatus, the combination of means providing a fruit holder adapted to receive a half fruit with its cut face uppermost and in a substantially horizontal plane, fruit contacting means mounted to rotate about an axis lying substantially in the plane of the cut surface of the half fruit and adapted to be brought into contact with the cut face of the half fruit, seed severing means associated with the contacting means for removing the seed from the half fruit, means for turning the fruit contacting means on its axis and stopping it at an angle inclined to the horizontal to superimpose the half fruit on said contacting means at a diagonal angle to the horizontal whereby said fruit may be removed from said contacting means in a direction laterally of the axis of turning of the fruit contacting means.

24. In a fruit treating apparatus, the combination of means forming a fruit holder adapted to receive a half fruit therein with its cut face uppermost, cutting means adapted to sever the seed from the half fruit, fruit contacting means mounted to rotate about an axis lying substantially in the plane of the cut surface of the half fruit and adapted to contact the cut face of the fruit during the seed severing operation, means for turning the fruit contacting means to a final position disposed at an inclination to the horizontal whereby to invert the fruit thereon, said contacting means after its turning movement lying at any angle with respect to a plane passing through the cut face of the fruit when in the fruit holder prior to the coring or pitting operation, and ejecting means associated with said fruit contacting means for forcibly ejecting the half fruit from the contacting means laterally while said contacting means is in said inverted inclined position.

25. In a fruit treating apparatus, the combination of means providing a fruit holder adapted to receive a half fruit thereon with its cut face uppermost, means for severing the seed from the fruit, means mounted to rotate about an axis lying substantially in the plane of the cut surface of the fruit for contacting the cut face of the fruit during the seed severing operation, means for turning the contacting means on its axis to invert the fruit, and ejecting means adapted to act upon the cut face only of the fruit for ejecting the same laterally of the axis of turning of the fruit while in the fruit holder.

26. In a fruit treating apparatus, the combination of means providing a fruit holder adapted to receive a half fruit thereon with its cut face uppermost, means for severing the seed from the fruit, means for contacting the cut face of the fruit during the seed severing operation, means for turning the contacting means about an axis passing substantially through a diameter of the fruit, and means for ejecting the fruit from the fruit holder by causing the fruit to substantially roll laterally of the fruit holder on the axis on which it was turned.

27. In a fruit treating apparatus, the combination of means providing a fruit holder adapted to receive a half fruit thereon with its cut face uppermost, means for coring or pitting the fruit, means for contacting the cut face of the fruit on opposite sides of the coring or pitting means during the coring or pitting operation, means for inverting the contacting means to a position angularly disposed with respect to the horizontal, ejecting means adapted to lie between the contacting means and the cut face of the fruit on one side only of the axis of turning of the fruit, and means for operating said ejecting means whereby to act upon that portion of the fruit with which the ejecting means is in contact for imparting a lateral rolling motion to the fruit in a direction to eject the fruit laterally of the fruit holder.

28. In a fruit treating apparatus, the combination of a main frame having slideways, a crosshead slidable vertically in said frame, four vertically upstanding posts on said crosshead, collars affixed to the upper ends of said crosshead, a bracket affixed to said crosshead between the upper ends of two of said posts, a lever pivotally mounted on said bracket and extending substantially centrally of the four posts, a plurality of oppositely disposed levers pivoted on said centrally disposed lever, said opposed ends of said lever having pairs of arms, each arm underlying a collar on a post, springs overlying each collar, adjustable means for urging said springs against said collar, means on said carriage providing fulcrum points for the opposed ends of each of said levers, said fulcrum points being disposed at variant distances from the pivotal axis of said levers, a friction roller on said pivotal axis, a cam on said carriage underlying said friction roller and adapted to slightly raise said friction roller, a pair of smaller carriages, means for mounting each of said smaller carriages between the bottoms of two of said posts, a sleeve rotatably mounted in each of said smaller carriages, a fruit contacting paddle turnably mounted in said sleeves, coring means turnably mounted in said sleeves and operating between spaced portions of each of said paddles, the upper face of a portion of each paddle being provided with a movable member normally lying in the face of the paddle and providing an ejecting means, means for reversely rotating said coring means and said paddles, means on said frame comprising a plurality of spaced apart fruit holders adapted to hold a half fruit in each with its face uppermost, means for moving said holders in synchronized relation to predetermined position, means synchronized with the movement of said holders for reciprocating said first mentioned carriage on its slideway to position the paddle and coring means relatively to the cut face of a fruit in the holder, means synchronized with the movement of said first mentioned carriage for actuating the paddle actuating mechanism and the coring mechanism and for actuating the cam to slightly raise the friction roller on the shaft on which the levers are pivoted, an ejector actuating mechanism mounted on said carriage, means actuated by the reciprocation of said carriage for actuating said ejector actuating mechanism, all of said mechanism actuating in timed relation.

29. In a fruit coring device, the combination of means providing a frame, a fruit holder on said frame adapted to hold a half fruit of elongated shape with its cut face uppermost, an elongated coring mechanism having its longitudinal axis parallel to the stem axis of the half fruit in the holder, and means for vertically reciprocating said coring mechanism toward and from the fruit holder including means to cause said coring mechanism to press upon the cut face of the fruit at the blossom end of the fruit with greater pressure than at the neck end of the fruit.

30. In a machine for coring half fruit of elongated nature, the combination of means forming a holder adapted to receive a half fruit of elongated nature with its cut face uppermost, coring mechanism of elongated shape with its axis extending parallel to the stem axis of the half fruit to be cored, means for moving the coring mechanism in an arcuate path to core the half fruit, and means for pressing the coring mechanism resiliently into contact with the cut face of the fruit prior to the coring operation, said means including mechanism for causing said coring mechanism to exert a greater pressure against the blossom end of the fruit than at the neck end of the fruit.

31. In a fruit processing device, the combination of means forming a fruit holder to receive and hold a half fruit with its cut face uppermost, seed severing mechanism for the fruit comprising a member adapted to contact the cut face of the fruit and for cutting the central portion at the cut face of the fruit to sever the seed from the same, including mechanism for inverting the fruit to a position diagonal to the horizontal preliminary to discharging the fruit from the inverting mechanism, said seed severing mechanism engaging the half fruit to retain it on the turning means while said inverted fruit is in said diagonal position.

32. In a processing mechanism for half fruit, the combination of means providing a turret having a plurality of spaced-apart movable fruit holders, each adapted to receive a half fruit with its cut face uppermost, fruit receiving means, means for positioning the fruit receiving means laterally adjacent one of the fruit holders at the seed severing station, means for severing the seed from the fruit and for discharging the fruit laterally from the fruit holder into the laterally-disposed adjacent receiving means, means for shifting the receiving means out of the plane of movement of the fruit holder, for thereafter moving said fruit holder and for positioning a subsequent fruit holder into the position formerly occupied by the first-mentioned fruit holder, and for thereafter repositioning the receiving means adjacent to and laterally of the second-mentioned fruit holder.

33. In a fruit cutting apparatus, the combination of means providing a succession of spaced-apart fruit holders, each adapted to receive a half fruit with its cut face uppermost, cutting means adapted to operate upon a half fruit when in the holder, means for intermittently moving the fruit holder to a predetermined position, means for actuating the cutting means when in said position to cut the fruit, means for discharging the cut fruit from the fruit holder in said position, receiving means adapted to receive the cut fruit when discharged from said fruit holder, means for positioning said receiving means substantially in the plane of the top of the fruit holder and laterally thereof to so receive the fruit, means for raising the receiving means out of said plane to permit the movement of the next succeeding fruit holder into cutting position, and for thereafter lowering said receiving means into substantially the plane of the next succeeding fruit holder and laterally thereof.

34. In fruit treating apparatus, the combination of fruit holding means adapted to hold a half fruit with its cut face uppermost, fruit cutting and discharging mechanism adapted to be positioned at and contact with the cut face of the fruit, means for cutting the fruit and for shifting the fruit about an axis parallel with an axis passing through the plane of the cut face of the fruit into a diagonal position, the plane of which lies diagonally to the plane of the cut face of the fruit when first contacted, fruit receiving means disposed laterally of the fruit holder adapted to receive the cut fruit, and means for discharging the cut fruit from the diagonal inverted position into said receiving means.

35. In a fruit treating apparatus, the combination of a fruit holder adapted to receive a half fruit with its cut face uppermost and with its stem axis lying in a predetermined direction, means for cutting the seed containing section of the half fruit while so held, means for turning the half fruit on its stem axis to a more or less inverted position, and means for ejecting the half fruit laterally of the fruit holder in a direction substantially at right angles to the position of the stem axis of the fruit when the fruit was originally positioned in the fruit holder.

36. In a device for treating half fruit, the combination of a frame having movable fruit holding means thereon adapted to receive a half fruit with its cut face exposed, means for moving the fruit holding means, a carriage shiftable in a direction at right angles to the path of movement of the fruit holding means, means for imparting movement to said carriage to cause it to approach toward and away from the path of movement of the fruit holding means, cutting means mounted on said carriage for cutting the central seed containing section from the half fruit while held in said fruit holding means, means mounted on said carriage adapted to contact the cut fact of the half fruit while said half fruit is held in said fruit holding means and during the operation of the cutting means upon the flesh of the half fruit for preventing movement of the half fruit relative to the fruit holding means, and means forming a yielding, resilient mounting between the carriage and the cutting means.

37. In a half pear treating machine, the combination of a support, a holder movably mounted on said support and constructed to hold a half pear divided in a plane substantially along its stem axis, means for moving said holder in a predetermined path, said holder including means for holding the half pear with its cut face exposed and with its stem axis in a predetermined direction, coring means having an elongated cutting edge for coring said half pear, mounting means for said coring mechanism to position the elongated coring mechanism substantially parallel to the stem axis of the half pear, means for moving the mounting means and the fruit holder relatively to cause the coring mechanism to contact the cut face of the half pear and to core the same, and means operable at the completion of the coring operation for slightly raising the coring mechanism away from the half pear more at the neck end of the half pear than at the butt end of the half pear.

38. In a fruit treating device, the combination of a support, a fruit holder mounted thereon for holding a half pear split substantially parallel to its stem axis and with its cut face exposed, coring mechanism for said half pear including cutting means having a linear cutting edge extending in a direction longitudinally of the stem axis of the half fruit, said coring mechanism including fruit contacting means adapted to contact the cut face of the half pear during the coring operation, mounting means for said fruit contacting means and said coring means, means for moving said fruit contacting means and said coring means to cause the contacting means and coring means to contact the face of the half fruit, and means operative upon the completion of the coring operation for slightly raising the fruit contacting means from the face of the fruit more at one portion of the half fruit than at the other portion of the half fruit.

39. In a fruit treating device, the combination of a frame, a fruit holder mounted thereon including means adapted to receive a half pear split substantially parallel to its stem axis and with its cut face exposed, coring mechanism for said half pear including cutting means having a linear cutting edge extending in a direction longitudinally of the stem axis of the half fruit, said coring mechanism including a member adapted to contact the cut face of the half pear during the coring operation, mounting means for said fruit contacting member and said coring means, means for moving said mounting, said fruit contacting member and said coring means relatively to cause the contacting means and coring means to contact the face of the half fruit, and means operative upon the completion of the coring operation for slightly raising the fruit contacting means from the face of the fruit more at the neck end of the half pear than at the butt end of the half pear.

40. In a fruit treating apparatus, the combination of means for holding a half fruit split substantially along its stem axis and with its cut face exposed and with its longer seed axis extending in a predetermined direction, fruit contacting means adapted to contact the cut face of the half fruit, seed section severing means associated with the contacting means for removing the seed section from the half fruit, and means for turning the fruit contacting means on an axis substantially coextensive with the elongated seed axis of the half fruit and for stopping the contacting means at an angle inclined to a horizontal plane, whereby to superimpose the half fruit on said contacting means at an angle diagonal to said horizontal plane, whereby said half fruit may be removed from said contacting means in a direction laterally of said axis of turning of the half fruit contacting means.

41. In a fruit treating apparatus, the combination of means for holding a half fruit split substantially along its elongated seed axis and with its cut face exposed, cutting means adapted to sever the seed section from the half fruit, fruit contacting means adapted to contact the cut face of the half fruit during the cutting operation, means for turning the fruit contacting means substantially about the elongated seed axis of the half fruit to a position disposed at an inclination to a horizontal plane, whereby substantially to invert the fruit, said fruit contacting means after its turning movement lying at an angle with respect to a plane passing through the cut face of the fruit when in the fruit holder and prior to the seed section severing operation, and ejecting means associated with said fruit contacting means for forcibly striking the half fruit in a manner to eject it laterally of the axis of turning of said contacting means and while said contacting means is in said substantially inverted inclined position.

42. In a fruit treating apparatus, the combination of means adapted to hold a half fruit split substantially along its stem axis and with its cut face exposed, means for severing the seed section from the half fruit, means for contacting the cut face of the half fruit during the seed severing operation, means for turning the contacting means on an axis lying substantially in the plane of the cut face of the half fruit substantially to invert the half fruit, and ejecting means adapted to strike the cut face of the half fruit in a manner to eject the same laterally of the axis of turning of the half fruit.

43. In a fruit treating apparatus, the combination of means adapted to hold a half fruit split substantially along its stem axis and with its cut face exposed, means for severing the seed section from the half fruit, means for contacting the cut face of the half fruit during the seed severing operation, means for turning the contacting means on an axis lying substantially in the plane of the cut face of the half fruit substantially to invert the half fruit, and ejecting means for ejecting the half fruit laterally of the axis of turning of the half fruit.

44. In a fruit treating apparatus, the combination of means for holding a half fruit split substantially along its elongated seed axis and with its cut face uppermost, means for severing the seed section from the half fruit, means for contacting the cut face of the half fruit during the seed severing operation, means for turning the contacting means about an axis passing substantially through the plane of the cut face of the half fruit, and means for ejecting the half fruit from its fruit holder, including means for turning the fruit contacting means about an axis passing substantially through the cut face of the half fruit, said ejecting means causing the half fruit to roll substantially laterally of the fruit holder and about the axis on which the fruit contacting means was turned.

45. In a fruit cutting apparatus, the combination of means for holding a half fruit split substantially along its stem axis and with its cut face exposed and with its stem axis extending in a predetermined direction, mechanism for holding the fruit holding means stationary, means for cutting the seed containing section from the half fruit while so held, and mechanism for ejecting the cut half fruit from the fruit holder while held stationary, said ejecting mechanism including means for inverting the half fruit out of the holder and then moving the half fruit laterally of the stem axis of the half fruit.

46. In a device of the class described, in combination with a support, a turret mounted on said support for intermittent rotation, said turrret carrying a plurality of spaced apart fruit holding means each adapted to hold a half fruit with its cut face exposed, means for intermittently rotating said turret to move said fruit holding means in a horizontal plane, a head mounted on said support to reciprocate rectilinearly in a vertical plane toward and from each fruit holder, means for actuating said head in synchronism with the intermittent movement of said turret, complemental fruit holding means carried by said head and adapted to contact the exposed face of the half fruit during a portion of the movement of said reciprocal head, seed section severing means carried by said head and cooperatively associated with said complemental fruit holding means, and operating means carried by said head and connected with said complemental fruit holding means and said seed severing means for actuating the same in timed relation to the movement of said turret and said head to position the complemental holding means and the seed severing means into contact with the cut face of the half fruit while held in the first mentioned holding means to actuate the seed severing means to sever the seed section from the half fruit, to turn the complemental holding means to invert the half fruit relatively to the first mentioned holding means, and thereafter to raise the complemental holding means and seed severing means from the first mentioned fruit holding means.

47. In a device of the class described, in combination with a support, a turret mounted on said support for intermittent rotation, said turret carrying a plurality of spaced apart fruit holding means each adapted to hold a half fruit with its cut face exposed, means for intermittently rotating said turret to move said fruit holdng means in a horizontal plane, a head mounted on said support to reciprocate rectilinearly in a vertical plane toward and from each fruit holder, means for actuating said head in synchronism with the intermittent movement of said turret, complemental fruit holding means carried by said head and adapted to contact the exposed face of the half fruit during a portion of the movement of said reciprocal head, seed section severing means carried by said head and cooperatively associated with said complemental fruit holding means, and operating means carried by said head and connected with said complemental fruit holding means and said seed severing means for actuating the same in timed relation to the movement of said turret and said head to position the complemental fruit holding means into contact with the exposed face of the half fruit held in the holding means and to position the seed severing means into contact with the cut face of the half fruit so held between the holding means, and to sever the seed section from the half fruit and to cause the complemental fruit holding means to discharge the half fruit from the fruit holder.

48. In a device of the class described, in combination with a support, a turret mounted on said support for intermittent rotation in a horizontal plane, said turret carrying a plurality of spaced apart fruit holding means each adapted to hold a half fruit with its cut face exposed, means for intermittently rotating said turret to move said fruit holding means in a horizontal plane, a seed section severing head mounted on said support for rectilinearly reciprocal movement in a vertical plane, said head including a shaft, seed cutting means carried by said head and actuated by said shaft, said cutting means being mounted to turn about an axis disposed substantially parallel to and adjacent the plane of the cut face of the fruit to remove the central seed containing portion, means for turning the shaft, and means carried by said head for turning the cut half fruit about substantially the same axis of turning, whereby substantially to invert the half fruit.

49. In a device of the class described, in combination with a support, a turret mounted on said support for intermittent rotation in a horizontal plane, said turret carrying a plurality of spaced apart fruit holding means each adapted to hold a half fruit with its cut face exposed, means for intermittently rotating said turret to move said fruit holding means in a horizontal plane, a seed severing head mounted on said support for rectilinearly reciprocal movement in a vertical plane toward and from each fruit holder, seed section severing means carried by said head and adapted to be positioned, upon actuation of said head, into contact with the cut face of the half fruit, means for actuating said seed severing means when so positioned to sever the seed section from the half fruit, and means carried by said head for discharging the fruit from said fruit holder.

50. In a device of the class described, in combination with a support, a turret mounted on said support for intermittent rotation in a horizontal plane, said turret carrying a plurality of spaced apart fruit holding means each adapted to hold a half fruit with its cut face exposed, means for intermittently rotating said turret to move said fruit holding means in a horizontal plane, a head mounted on said support for rectilinearly reciprocal movement in a vertical plane toward and from each fruit holder, said head including a shaft carried by said head, seed section cutting means actuated by said shaft and adapted to be brought into contact with the cut face of the half fruit upon actuation of said head, complemental fruit holding means carried by said head and adapted to be brought into contact with the cut face of the half fruit prior to the severance of the seed section of the half fruit, and a lost motion driving connection between said shaft and said complemental fruit holding means for causing intermittent successive actuation of the seed severing means and the complemental fruit holding means with respect to the cut face of the half fruit.

51. In a fruit treating apparatus, in combination with a support, a turret mounted on said support for intermittent movement in a predetermined plane, a series of fruit holders carried by said turret and each adapted to hold a half fruit with its cut face exposed, a head reciprocally mounted on said support and adapted in its movement to intersect the path of movement of each fruit holder, a drive shaft mounted on said head, seed severing means connected thereto and adapted to be contacted with the face of the half fruit for severing the seed therefrom, means carried by said head for reversely driving said shaft at predetermined times, fruit discharging means mounted on said head and adapted to contact the cut face of the fruit to turn the same to discharge the fruit from the fruit holder, said discharging means including a sleeve surrounding said shaft, said sleeve having a portion provided with angularly spaced shoulders, an abutment on said shaft adapted to turn between said shoulders, whereby to drive the fruit discharging means, said sleeve having spaced apart portions thereon disposed in predetermined angular position with relation to the shoulders thereof, and friction means cooperating with said portions, whereby to hold said sleeve stationary when not positively driven by said shaft.

52. In a fruit treating apparatus, in combination with a support, a turret mounted for intermittent movement on said support, said turret having a plurality of fruit holders each adapted to hold a half fruit with its cut face exposed, said fruit holder being adapted to move in a predetermined plane, a reciprocal head adapted to move rectilinearly at right angles to the path of movement of each fruit holder into registration therewith, seed section cutting and half fruit contacting mechanism mounted on said head and comprising seed severing means adapted to overlie the half fruit held in a fruit holder, and including fruit contacting means adapted to contact the cut face of the half fruit, common means carried by said reciprocal head for positively turning said seed severing means and said fruit contacting member, including means for causing the turning of the seed severing means while holding the fruit contacting member in stationary position.

53. In a fruit treating apparatus, the combination of a support, a turret intermittently rotatable on said support, said turret having a plurality of fruit holders each adapted to receive a half fruit with its cut face exposed, a head reciprocally mounted for rectilinear movement and adapted to move in a path at right angles to the path of movement of the fruit holders and the turret, seed section cutting means and fruit discharging mechanism carried by said head including a shaft, means for actuating the shaft, said seed section cutting means being actuated by said shaft and adapted upon movement of said head and operation of said shaft to be presented to the cut face of the half fruit and actuated by said shaft to cut the seed section thereof, the fruit discharging means on said head likewise being brought into contact with the face of the half fruit, means to actuate said discharging means to invert the half fruit to discharge the fruit from the holder, said means for actuating the fruit discharging means including mechanism actuated by the shaft during a portion of the movement of the shaft for positively moving the fruit contacting means with the shaft and for permitting the shaft to move independently of the fruit contacting means during another portion of the movement of the shaft, and means for holding the fruit contacting means from movement when said fruit contacting means is not actuated by said shaft.

54. In a fruit treating apparatus, the combination of means forming a fruit holder adapted to hold a half fruit with its cut face uppermost, means for intermittently moving said fruit holder in a predetermined path, a head mounted to reciprocate rectilinearly in a path at right angles to the path of movement of the fruit holder, said head including seed section cutting and fruit discharging mechanism thereon and movable therewith, said mechanism including a rotatable shaft, seed section cutting means carried thereby and adapted upon reciprocation of said head to contact the cut face of the half fruit to cut the seed section thereof, a sleeve on said head surrounding said shaft, a fruit contacting and turning member carried by said sleeve and adapted to contact the cut face of the half fruit and to turn the half fruit for discharging the same from the holder, means for reversely turning said shaft, a lost motion driving connection between said shaft and said sleeve, and means for frictionally holding said sleeve in predetermined positions.

55. In a device of the class described, in combination with a support, a turret mounted on said support for intermittent rotation, said turret carrying a plurality of spaced apart fruit holding means each adapted to hold a half fruit with its cut face exposed, means for intermittently rotating said turret to move said fruit holding means in a horizontal plane, a head mounted on said support to reciprocate rectilinearly in a vertical plane toward and from each fruit holder, means for actuating said head in synchronism with the intermittent movement of said turret, complemental fruit holding means carried by said head and adapted to contact the exposed face of the half fruit during a portion of the movement of said reciprocal head, seed severing means carried by said head and cooperatively associated with said complemental fruit holding means, and operating means carried by said head and connected with said complemental fruit holding means and said seed severing means for actuating the same in timed relation to the movement of said turret and said head to position the complemental fruit holding means and the seed severing means into contact with the exposed face of the half fruit held in the first mentioned fruit holding means, to actuate the seed severing means to sever the seed from the half fruit, and thereafter to actuate the head to remove said seed severing means and said complemental fruit holding means away from the first mentioned fruit holding means.

56. In a device of the class described, in combination with a support, a turret mounted on said support for intermittent rotation in a horizontal plane, said turret carrying a plurality of spaced apart fruit holding means each adapted to hold a half fruit with its cut face exposed, means for intermittently rotating said turret to move said fruit holding means in a horizontal plane, a seed cutting head mounted on said support for rectilinear reciprocal movement in a vertical plane toward and from each fruit holder, seed cutting means turnably mounted on said head and adapted to be positioned upon actuation of said head into contact with the cut face of the half fruit, fruit discharging means carried by said head in association with said seed cutting means and likewise adapted to be brought into contact with the cut face of the half fruit upon actuation of said head to its downward position, means for turning said seed cutting means when so positioned to cut the seed section therefrom, means for turning the fruit discharging means, whereby 'substantially to invert the fruit relatively to the first mentioned fruit holding means, means for ejecting the inverted fruit from the fruit discharging means, and means for thereafter raising said head.

MARK EWALD.
HENRY SKOG.

CERTIFICATE OF CORRECTION.

Patent No. 2,242,242. May 20, 1941.

MARK EWALD, ET AL.

It is hereby certified that error appears in the printed specification of the above numbered patent requiring correction as follows: Page 5, first column, line 3, for "nut 186" read --nut 196--; line 20, for "roller 22" read --roller 212--; page 11, first column, line 26, claim 14, for "tn" read --an--; page 12, first column, line 54, claim 24, for the word "any" read --an--; and that the said Letters Patent should be read with this correction therein that the same may conform to the record of the case in the Patent Office.

Signed and sealed this 15th day of July, A. D. 1941.

(Seal)

Henry Van Arsdale,
Acting Commissioner of Patents.